(12) United States Patent  
Golitschek Edler von Elbwart et al.

(10) Patent No.: US 9,282,567 B2  
(45) Date of Patent: Mar. 8, 2016

(54) TTI BUNDLING

(71) Applicant: Panasonic Intellectual Property Corporation of America, Torrance, CA (US)

(72) Inventors: Alexander Golitschek Edler von Elbwart, Darmstadt (DE); Christian Wengerter, Kleinheubach (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/373,012

(22) PCT Filed: Feb. 14, 2013

(86) PCT No.: PCT/EP2013/052917  
§ 371 (c)(1),  
(2) Date: Jul. 17, 2014

(87) PCT Pub. No.: WO2013/127634  
PCT Pub. Date: Sep. 6, 2013

(65) Prior Publication Data  
US 2015/0237644 A1    Aug. 20, 2015

(30) Foreign Application Priority Data

Feb. 29, 2012 (EP) .................................... 12157567

(51) Int. Cl.  
*H04L 12/00* (2006.01)  
*H04W 72/12* (2009.01)  
*H04W 72/04* (2009.01)

(Continued)

(52) U.S. Cl.  
CPC ............. *H04W 72/12* (2013.01); *H04L 1/1812* (2013.01); *H04L 1/1893* (2013.01); *H04L 1/1896* (2013.01); *H04L 5/0007* (2013.01); *H04W 72/042* (2013.01); *H04W 72/0413* (2013.01)

(58) Field of Classification Search  
None  
See application file for complete search history.

(56) References Cited

U.S. PATENT DOCUMENTS

2009/0129375 A1* 5/2009 Mohanty et al. ............... 370/356  
2010/0111139 A1* 5/2010 Arnott et al. .................. 375/133  
2010/0192035 A1* 7/2010 Sagfors et al. ................. 714/748

(Continued)

FOREIGN PATENT DOCUMENTS

WO    2009/123549 A2    10/2009  
WO    2009/133490 A1    11/2009

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.

(Continued)

*Primary Examiner* — Omar Ghowrwal  
(74) *Attorney, Agent, or Firm* — Seed IP Law Group PLLC

(57) ABSTRACT

The present invention relates to transmitting and receiving data in a multicarrier communication system in which the transmission and reception is performed on a transmission time interval basis. In particular, dynamic bundling of transmission time intervals is dynamically configurable for each scheduling assignment. The dynamic bundling may be applied in uplink and/or in downlink transmission between a terminal and a network node.

19 Claims, 13 Drawing Sheets

(51) Int. Cl.
*H04L 1/18* (2006.01)
*H04L 5/00* (2006.01)

(56) References Cited

U.S. PATENT DOCUMENTS

2010/0220623 A1    9/2010  Cave et al.
2011/0141952 A1*   6/2011  Wang et al. .................. 370/294
2011/0141991 A1    6/2011  Gao

OTHER PUBLICATIONS

3GPP TS 36.213 V10.4.0, "3rd Generation Partnership Project; Technical Specification Group Radio Access Network; Evolved Universal Terrestrial Radio Access (E-UTRA); Physical layer procedures (Release 10)," Dec. 2011, 125 pages.

3GPP TS 36.302 V10.3.0, "3rd Generation Partnership Project; Technical Specification Group Radio Access Network; Evolved Universal Terrestrial Radio Access (E-UTRA); Services provided by the physical layer (Release 10)," Dec. 2011, 19 pages.

3GPP TR 36.888 V0.2.0, "3rd Generation Partnership Project; Technical Specification Group Radio Access Network; Study on provision of low-cost MTC UEs based on LTE (Release 11)," Feb. 2012, 15 pages.

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.

International Search Report dated Apr. 25, 2013, for corresponding International Application No. PCT/EP2013/052917, 3 pages.

European Search Report dated Jun. 21, 2012, for corresponding EP Application No. 12157567, 3 pages.

Sesia et al., "LTE—The UMTS Long Term Evolution: From Theory to Practice," John Wiley & Sons, Ltd ISBN: 978-0-470-69716-0, 2009, Section 9.3.2.3, 42 pages.

* cited by examiner

| MCS Index $I_{MCS}$ | Modulation Order $Q'_m$ | TBS Index $I_{TBS}$ | Subframe Bundling Size [TTI] $N_{Bundling}$ | Redundancy Version $rv_{idx}$ |
|---|---|---|---|---|
| 0 | 2 | 0 | 1 | 0 |
| 1 | 2 | 1 | 1 | 0 |
| 2 | 2 | 2 | 1 | 0 |
| 3 | 2 | 3 | 1 | 0 |
| 4 | 2 | 4 | 1 | 0 |
| 5 | 2 | 5 | 1 | 0 |
| 6 | 2 | 6 | 1 | 0 |
| 7 | 2 | 7 | 1 | 0 |
| 8 | 2 | 8 | 1 | 0 |
| 9 | 2 | 9 | 1 | 0 |
| 10 | 2 | 10 | 1 | 0 |
| 11 | 4 | 10 | 1 | 0 |
| 12 | 4 | 11 | 1 | 0 |
| 13 | reserved | | 1 | 1 |
| 14 | reserved | | 1 | 2 |
| 15 | reserved | | 1 | 3 |
| 16 | 2 | 0 | 2 | 0 |
| 17 | 2 | 1 | 2 | 0 |
| 18 | 2 | 2 | 2 | 0 |
| 19 | 2 | 3 | 2 | 0 |
| 20 | 2 | 4 | 2 | 0 |
| 21 | 2 | 5 | 2 | 0 |
| 22 | 2 | 6 | 2 | 0 |
| 23 | 2 | 7 | 2 | 0 |
| 24 | 2 | 8 | 2 | 0 |
| 25 | 2 | 9 | 2 | 0 |
| 26 | 2 | 10 | 2 | 0 |
| 27 | 4 | 10 | 2 | 0 |
| 28 | 4 | 11 | 2 | 0 |
| 29 | reserved | | 2 | 1 |
| 30 | reserved | | 2 | 2 |
| 31 | reserved | | 2 | 3 |

Fig. 5A

| MCS Index $I_{MCS}$ | Modulation Order $Q'_m$ | TBS Index $I_{TBS}$ | Subframe Bundling Size [TTI] $N_{Bundling}$ | Redundancy Version $rv_{idx}$ |
|---|---|---|---|---|
| 0 | 2 | 0 | 1 | 0 |
| 1 | 2 | 1 | 1 | 0 |
| 2 | 2 | 2 | 1 | 0 |
| 3 | 2 | 3 | 1 | 0 |
| 4 | 2 | 4 | 1 | 0 |
| 5 | 2 | 5 | 1 | 0 |
| 6 | 2 | 6 | 1 | 0 |
| 7 | 2 | 7 | 1 | 0 |
| 8 | 2 | 8 | 1 | 0 |
| 9 | 2 | 9 | 1 | 0 |
| 10 | 2 | 10 | 1 | 0 |
| 11 | 4 | 10 | 1 | 0 |
| 12 | 4 | 11 | 1 | 0 |
| 13 | reserved | | 2 | 1 |
| 14 | reserved | | 2 | 2 |
| 15 | reserved | | 2 | 3 |
| 16 | 2 | 0 | 2 | 0 |
| 17 | 2 | 1 | 2 | 0 |
| 18 | 2 | 2 | 2 | 0 |
| 19 | 2 | 3 | 2 | 0 |
| 20 | 2 | 4 | 2 | 0 |
| 21 | 2 | 5 | 2 | 0 |
| 22 | 2 | 6 | 2 | 0 |
| 23 | 2 | 7 | 2 | 0 |
| 24 | 2 | 8 | 2 | 0 |
| 25 | 2 | 9 | 2 | 0 |
| 26 | 2 | 10 | 2 | 0 |
| 27 | 4 | 10 | 2 | 0 |
| 28 | 4 | 11 | 2 | 0 |
| 29 | reserved | | 1 | 1 |
| 30 | reserved | | 1 | 2 |
| 31 | reserved | | 1 | 3 |

Fig. 5B

| MCS Index $I_{MCS}$ | Modulation Order $Q_m$ | Subframe Bundling Size [TTI] $N_{Bundling}$ | TBS Index $I_{TBS}$ |
|---|---|---|---|
| 0 | 2 | 1 | 0 |
| 1 | 2 | 1 | 1 |
| 2 | 2 | 1 | 2 |
| 3 | 2 | 1 | 3 |
| 4 | 2 | 1 | 4 |
| 5 | 2 | 1 | 5 |
| 6 | 2 | 1 | 6 |
| 7 | 2 | 1 | 7 |
| 8 | 2 | 1 | 8 |
| 9 | 2 | 1 | 9 |
| 10 | 2 | 2 | 0 |
| 11 | 2 | 2 | 1 |
| 12 | 2 | 2 | 2 |
| 13 | 2 | 2 | 3 |
| 14 | 2 | 2 | 4 |
| 15 | 2 | 2 | 5 |
| 16 | 2 | 2 | 6 |
| 17 | 2 | 2 | 7 |
| 18 | 2 | 2 | 8 |
| 19 | 2 | 2 | 9 |
| 20 | 2 | 4 | 0 |
| 21 | 2 | 4 | 1 |
| 22 | 2 | 4 | 2 |
| 23 | 2 | 4 | 3 |
| 24 | 2 | 4 | 4 |
| 25 | 2 | 4 | 5 |
| 26 | 2 | 4 | 6 |
| 27 | 2 | 4 | 7 |
| 28 | 2 | 4 | 8 |
| 29 | 2 | 4 | 9 |
| 30 | 2 | 1 | Reserved for Retransmissions |
| 31 | 2 | 2 | Reserved for Retransmissions |

| MCS Index $I_{MCS}$ | Modulation Order $Q'_m$ | TBS Index $I_{TBS}$ | Subframe Bundling Size [TTI] $N_{Bundling}$ | Redund Version |
|---|---|---|---|---|
| 0 | 2 | 0 | 1 | 0 |
| 1 | 2 | 1 | 1 | 0 |
| 2 | 2 | 2 | 1 | 0 |
| 3 | 2 | 3 | 1 | 0 |
| 4 | 2 | 4 | 1 | 0 |
| 5 | 2 | 5 | 1 | 0 |
| 6 | 2 | 6 | 1 | 0 |
| 7 | 2 | 7 | 1 | 0 |
| 8 | 2 | 8 | 1 | 0 |
| 9 | 2 | 9 | 1 | 0 |
| 10 | 2 | 10 | 1 | 0 |
| 11 | 4 | 10 | 1 | 0 |
| 12 | 4 | 11 | 1 | 0 |
| 13 | 4 | 12 | 1 | 0 |
| 14 | 4 | 13 | 1 | 0 |
| 15 | 2 | 0 | 2 | 0 |
| 16 | 2 | 1 | 2 | 0 |
| 17 | 2 | 2 | 2 | 0 |
| 18 | 2 | 3 | 2 | 0 |
| 19 | 2 | 4 | 2 | 0 |
| 20 | 2 | 5 | 2 | 0 |
| 21 | 2 | 6 | 2 | 0 |
| 22 | 2 | 0 | 4 | 0 |
| 23 | 2 | 1 | 4 | 0 |
| 24 | 2 | 2 | 4 | 0 |
| 25 | 2 | 3 | 4 | 0 |
| 26 | 2 | 4 | 4 | 0 |
| 27 | 2 | 5 | 4 | 0 |
| 28 | 2 | 6 | 4 | 0 |
| 29 | reserved | | 1 | 1 |
| 30 | reserved | | 1 | 2 |
| 31 | reserved | | 1 | 3 |

| Hopping flag | No TTI Bundling | TTI Bundling |
|---|---|---|
| 0 | No hopping | Hopping Bundle adjacent subframes |
| 1 | Hopping | Hopping Bundled TTI are 8 ms apart |

| MCS Index $I_{MCS}$ | Modulation Order $Q_m$ | TBS Index $I_{TBS}$ | Subframe Bundling Size [TTI] $N_{Bundling}$ | Inter-TTI Interval [TTI] | Redundancy Version $rv_{idx}$ |
|---|---|---|---|---|---|
| 0 | 2 | 0 | 1 | n/a | 0 |
| 1 | 2 | 1 | 1 | n/a | 0 |
| 2 | 2 | 2 | 1 | n/a | 0 |
| 3 | 2 | 3 | 1 | n/a | 0 |
| 4 | 2 | 4 | 1 | n/a | 0 |
| 5 | 2 | 5 | 1 | n/a | 0 |
| 6 | 2 | 6 | 1 | n/a | 0 |
| 7 | 2 | 7 | 1 | n/a | 0 |
| 8 | 2 | 8 | 1 | n/a | 0 |
| 9 | 2 | 9 | 1 | n/a | 0 |
| 10 | 2 | 10 | 1 | n/a | 0 |
| 11 | 4 | 10 | 1 | n/a | 0 |
| 12 | 4 | 11 | 1 | n/a | 0 |
| 13 | 4 | 12 | 1 | n/a | 0 |
| 14 | 4 | 13 | 1 | n/a | 0 |
| 15 | 2 | 0 | 2 | 1 | 0 |
| 16 | 2 | 1 | 2 | 1 | 0 |
| 17 | 2 | 2 | 2 | 1 | 0 |
| 18 | 2 | 3 | 2 | 1 | 0 |
| 19 | 2 | 4 | 2 | 1 | 0 |
| 20 | 2 | 5 | 2 | 1 | 0 |
| 21 | 2 | 6 | 2 | 1 | 0 |
| 22 | 2 | 0 | 2 | 8 | 0 |
| 23 | 2 | 1 | 2 | 8 | 0 |
| 24 | 2 | 2 | 2 | 8 | 0 |
| 25 | 2 | 3 | 2 | 8 | 0 |
| 26 | 2 | 4 | 2 | 8 | 0 |
| 27 | 2 | 5 | 2 | 8 | 0 |
| 28 | 2 | 6 | 2 | 8 | 0 |
| 29 | reserved | | 1 | n/a | 1 |
| 30 | reserved | | 1 | n/a | 2 |
| 31 | reserved | | 1 | n/a | 3 |

Fig. 8

| MCS Index $I_{MCS}$ | Modulation Order $Q_m$ | Subframe Bundling Size [TTI] $N_{Bundling}$ | TBS Index $I_{TBS}$ |
|---|---|---|---|
| 0 | 2 | 1 | 0 |
| 1 | 2 | 1 | 1 |
| 2 | 2 | 1 | 2 |
| 3 | 2 | 1 | 3 |
| 4 | 2 | 1 | 4 |
| 5 | 2 | 1 | 5 |
| 6 | 2 | 1 | 6 |
| 7 | 2 | 1 | 7 |
| 8 | 2 | 1 | 8 |
| 9 | 2 | 1 | 9 |
| 10 | 4 | 1 | 9 |
| 11 | 4 | 1 | 10 |
| 12 | 4 | 1 | 11 |
| 13 | 4 | 1 | 12 |
| 14 | 4 | 1 | 13 |
| 15 | 4 | 1 | 14 |
| 16 | 2 | 2 | 0 |
| 17 | 2 | 2 | 1 |
| 18 | 2 | 2 | 2 |
| 19 | 2 | 2 | 3 |
| 20 | 2 | 2 | 4 |
| 21 | 2 | 2 | 5 |
| 22 | 2 | 2 | 6 |
| 23 | 2 | 4 | 0 |
| 24 | 2 | 4 | 1 |
| 25 | 2 | 4 | 2 |
| 26 | 2 | 4 | 3 |
| 27 | 2 | 4 | 4 |
| 28 | 2 | 4 | 5 |
| 29 | 2 | 4 | 6 |
| 30 | 2 | 1 | Reserved for Retransmissions |
| 31 | 2 | 2 | |

Fig. 9

TTI BUNDLING

The present invention relates to transmission and reception of data in a multicarrier communication system. In particular, the present invention relates to transmitting and receiving data in a shared data channel.

TECHNICAL BACKGROUND

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink will support data modulation schemes QPSK, 16QAM, and 64QAM and the uplink will support QPSK, 16QAM, and at least for some devices also 64QAM, for physical data channel transmissions. The term "downlink" denotes direction from the network to the terminal. The term "uplink" denotes direction from the terminal to the network.

LTE's network access is to be extremely flexible, using a number of defined channel bandwidths between 1.4 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As shown above, the E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

FIG. 2 illustrates structure of a component carrier in LTE Release 8. The downlink component carrier of the 3GPP LTE Release 8 is sub-divided in the time-frequency domain in so-called subframes each of which is divided into two downlink slots, one of which is shown in FIG. 2 as 220 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB 230 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 230 consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 10)", version 10.4.0, 2012, Section 6.2, freely available at www.3gpp.org, which is incorporated herein by reference). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10 MHz) or in units of resource blocks, e.g. for the downlink case the cell bandwidth can equivalently expressed as e.g. 10 MHz or $N_{RB}^{DL}=50$ RB.

A channel resource may be defined as a "resource block" as exemplary illustrated in FIG. 3 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink: Localised Virtual Resource Block (LVRB) and Distributed Virtual Resource Block (DVRB). In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 the downlink control signaling is basically carried by the following three physical channels:
Physical control format indicator channel (PCFICH) for indicating the number of OFDM symbols used for control signaling in a sub-frame (i.e. the size of the control channel region);
Physical hybrid ARQ indicator channel (PHICH) for carrying the downlink ACK/NACK associated with uplink data transmission; and
Physical downlink control channel (PDCCH) for carrying downlink scheduling assignments and uplink scheduling assignments.

The PCFICH is sent from a known position within the control signaling region of a downlink sub-frame using a known pre-defined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. The PDCCH for the user equipment is transmitted on the first of either one, two or three OFDM symbols according to PCFICH within a sub-frame.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

Physical uplink shared channel (PUSCH) carries user data. Physical Uplink Control Channel (PUCCH) carries signaling in the uplink direction such as scheduling requests, HARQ positive and negative acknowledgements in response to data packets on PDSCH, and channel state information (CSI).

FIG. 3 schematically illustrates an example of mapping of data onto a physical channel in LTE. It is noted that this example is a simplified mapping for illustrational purposes only. User data (IP packets) may be generated by the user application. They may include speech, video, text, or any other media possibly compressed and encapsulated into other protocols before forming the IP packets. The IP packets are in EUTRAN further processed on the PDCP layer resulting in addition of a PDCP header. The PDCP packets formed in this manner are further segmented and/or reassembled (reassembling being shown in the figure) into RLC packets to which an RLC header is added. One or more RLC packets are then encapsulated into a MAC packet including also a MAC header and padding, if necessary. The MAC packet is also called "transport block". Thus, a transport block is from the point of view of the physical layer a packet of user data entering the physical layer. There are predefined transport block sizes (TBS) which may be used in LTE. The transport block is then within one transmission time interval (TTI) mapped onto the subframes on the physical layer (PHY). Details of the mapping of data starting with transport blocks up to the interleaving is shown in FIGS. 5.2.2-1 and 5.3.2-1 and described in the related description of the 3GPP TS 36.212, v.10.4.0, "Evolved universal terrestrial radio access (E-UTRA); Multiplexing and channel coding" available freely at www.3gpp.org and incorporated herein by reference, for the uplink and downlink transmission of user data respectively. Furthermore, the physical channel mapping is described in detail in FIG. 6.3-1 and FIG. 5.3-1 for downlink and uplink, respectively, and the related description in 3GPP TS 36.211, v10.4.0. An functional overview of uplink and downlink shared channel is furthermore given in sections 6.1.1 and 6.2.1 (respectively) of 3GPP TS 36.302, v10.3.0, "Evolved Universal Terrestrial Radio Access (E-UTRA); Services provided by the physical layer".

A possibility provided by the LTE in order to improve battery lifetime is the discontinuous transmission (DTX) and reception (DRX). In order to provide a reasonable battery consumption of the terminal (UE), LTE Rel-8/9 as well as Rel-10 provides a concept of discontinuous reception (DRX). Accordingly, the terminal does not have to regularly monitor the control channels but rather can switch off the transmission and the reception over long periods and needs to activate the transceiver only at predefined or required time instances.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback (mentioned above) transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

Accordingly, the resource grants are transmitted from the eNodeB to the UE in a downlink control information (DCI) via PDCCH. The downlink control information may be transmitted in different formats, depending on the signaling information necessary. In general, the DCI may include:

a resource block assignment (RBA),
modulation and coding scheme (MCS).

It may include further information, depending on the signaling information necessary, as also described in Section 9.3.2.3 of the book "*LTE: The UMTS Long Term Evolution from theory to practice*" by S. Sesia, I. Toufik, M. Baker, April 2009, John Wiley & Sons, ISBN 978-0-470-69716-0, which is incorporated herein by reference. For instance, the DCI may further include HARQ related information such as redundancy version, HARQ process number, or new data indicator; MIMO related information such as pre-coding; power control related information, etc.

The resource block assignment specifies the physical resource blocks which are to be used for the transmission in uplink or downlink.

The modulation and coding scheme defines the modulation scheme employed for the transmission such as QPSK, 16-QAM or 64-QAM. The lower the order of the modulation, the more robust is the transmission. Thus, 64-QAM is typically used when the channel conditions are good. The modulation and coding scheme also defines a code rate for a given modulation. The code rate is chosen depending on the radio link conditions: a lower code rate can be used in poor channel conditions and a higher code rate can be used in the case of good channel conditions. "Good" and "bad" here is used in terms of the signal to noise and interference ratio. The finer adaptation of the code rate is achieved by puncturing or repetition of the generic rate depending on the error correcting coder type.

For uplink resource assignments (for transmissions on the Physical Uplink Shared CHannel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively modulation and coding scheme (MCS) field has for example a size of bits, which corresponds to 32 entries. 3 TF/MCS table entries are reserved for indicating RVs 1, 2 or 3. The remaining MCS table entries are used to signal the MCS level (TBS) implicitly indicating RV0.

For details on the TBS/RV signaling for uplink assignments on PDCCH please see 3GPP TS 36.213, "*Evolved Universal Terrestrial Radio Access (E-UTRA); Physical layer procedures*", version 3GPP TS 36.213,v.10.4.0, 2012 (available at http://www.3gpp.org and incorporated herein by reference). The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

In order to increase frequency diversity, LTE provides a possibility of hopping. Two hopping modes are supported, hopping only between subframes (inter-subframe hopping) and hopping both between and within subframes (inter- and intra-subframe hopping). In case of intrasubframe hopping, a frequency hop occurs at the slot boundary in the middle of the subframe. This provides frequency diversity within a codeword. Inter-subframe hopping provides frequency diversity between HARQ retransmissions of a transport block, as the frequency allocation hops every allocated subframe.

An improvement of Release 11 has been agreed as a study item for standardization and relates to providing low cost machine type communication (MTC) terminals based on LTE. Moreover, LTE RAN enhancements for diverse data applications are under study. The machine type communication traffic profiles include sporadic data access for exchange of relatively small data amounts. Such a type of communication is particularly relevant for applications which require always-on connectivity, such as smart phones, sporadic access for the purpose of checking emails or social network updates. The aim of the working item is to identify and specify mechanisms at the radio access network level that enable enhancing the ability of the LTE to handle diverse traffic profiles. In particular, the aim is to reduce the costs and complexity of terminals in order to extend the battery life. The machine type communication traffic is in general delay insensitive data traffic in which the terminals and/or eNodeB can wait for some time until the data is delivered. Such traffic may be, for instance, the planned data traffic including regular updates such as measurements or other reports. The amount of data exchange is typically rather small and can be delivered in few subframes. For instance, such data may be SMS type messages for controlling or reporting by a machine.

It is suggested that the MTC terminals shall only operate with the 1.4 MHz bandwidth only (or another relatively small bandwidth compared to the current minimum requirement of 20 MHz) and shall be only addressable by E-PDCCH since the PDCCH is incompatible for different bandwidths. Addressing by E-PDCCH means that the DCI is transmitted in the PDSCH region. E-PDCCH is an enhanced PDCCH channel under study for release 11, which should provide more efficient and robust transmission.

The MTC terminals should have a reduced functionality in comparison with LTE terminals. As described above, the MTC terminals may also differ from the other terminal types by the characteristics of its traffic. A traffic model for the MTC traffic is provided in Annex A of 3GPP TR 36.888, v.0.2.0, "*Study on provision of low-cost Machine-Type Communications (MTC) User Equipments (UEs) based on LTE*", 2012, freely available at www.3gpp.org in document number R1-120891 and incorporated herein by reference. In particular, the packet sizes of 1000 bits and 10000 bits are considered for evaluation of candidate technologies. Candidate technologies for MTC may be limited to support of QPSK modulation only or in general lower level modulations, reduced number of hybrid ARQ processes or no hybrid ARQ at all, and bandwidth limitations which could however reduce the frequency diversity and therefore affect the coverage.

As can be seen from the above examples, the MTC terminals should have the reduced functionality, which may mainly affect their spectral deficiency. The particularities of the MTC traffic such as transmitting data only at predefined time points and low-power requirements also provide opportunities for considering new and more flexible physical channel mapping strategies.

SUMMARY OF THE INVENTION

The problem underlying the present invention is based on the observation that in particular a communication system providing low-cost terminals such as MTC terminals or an enhanced coverage in the areas with bad channel conditions, could benefit from less overhead and higher packet sizes on the physical layer. A further problem underlying the present invention is based on the observation that currently, no TTI-bundling is possible for downlink.

The aim of the present invention is to provide an efficient transmission mechanism enabling a higher flexibility with respect to the physical layer transmission.

This is achieved by the features of the independent claims.

Advantageous embodiments are subject matter of the dependent claims.

In accordance with a first aspect of the present invention, an apparatus is provided for transmitting data in a multicarrier communications system, transmission of data being performed in transmission time intervals, the apparatus comprising: a control information reception unit for receiving scheduling information indicating resources on which the terminal is scheduled to transmit data and including a bundling indication for indicating whether the scheduled transmission is to be performed in one or more transmission time intervals; and a data transmission unit for transmitting the data in the scheduled resources in accordance with the received bundling indication.

In accordance with another aspect of the present invention, an apparatus is provided for receiving data in a multicarrier communications system, reception of data being performed in transmission time intervals, the apparatus comprising: a control information reception unit for receiving scheduling information indicating resources on which the terminal is scheduled to receive of data and including a bundling indication for indicating whether the scheduled reception is to be performed in one or more transmission time intervals; and a data reception unit for receiving the data in the scheduled resources in accordance with the received bundling indication.

In accordance with another aspect of the present invention, a scheduling node is provided for transmitting data to a terminal in a multicarrier communication system in which the transmission of data is performed in transmission time intervals, the scheduling node comprising: a control information transmission unit for transmitting scheduling information indicating resources on which a terminal is scheduled to receive data, and including a bundling indication for indicating whether transmission time interval bundling is to be applied or not for the scheduled transmission to the terminal; and a data transmission unit for transmitting the data to the terminal in the scheduled transmission resources and in accordance with the transmitted bundling indication.

In accordance with another aspect of the present invention, a scheduling node is provided for receiving data from a terminal in a multicarrier communication system in which the transmission of data is performed in transmission time intervals, the scheduling node comprising: a control information transmission unit for transmitting scheduling information indicating resources on which a terminal is scheduled to transmit data, and including a bundling indication for indicating whether transmission time interval bundling is to be applied or not for the scheduled reception of data from the terminal; and a data reception unit for receiving the data from the terminal in the scheduled reception resources and in accordance with the transmitted bundling indication.

The terminal may further comprise a data size determining unit for determining the size of the data for the scheduled transmission or reception based on the number of transmission time intervals in which the data is to be transmitted or received and based on a number of frequency resources effectively used for the scheduled transmission or reception.

In particular the transport block size may be calculated according to one of the following approaches:

- based on number of subcarriers used for transmission in a single subframe multiplied by the bundle size and based on the transport block size used for transmission in a single subframe,
- based on number of subcarriers used for transmission in a single subframe and based on the transport block size used for transmission in a single subframe multiplied by the bundle size,
- based on number of subcarriers used for transmission in a single subframe and based on the transport block size index used for determining the transport block size for transmission in a single subframe, the index multiplied by the bundle size,
- based on number of subcarriers used for transmission in a single subframe multiplied by a number smaller than the bundle size and based on the transport block size used for transmission in a single subframe,
- based on number of subcarriers used for transmission in a single subframe and based on the transport block size used for transmission in a single subframe multiplied by a number smaller than the bundle size,
- based on number of subcarriers used for transmission in a single subframe and based on the transport block size index used for determining the transport block size for transmission in a single subframe, the index multiplied by a number smaller than the bundle size.

Instead of using the number of subcarriers as a basis, other units that are derived from a number of subcarriers may be equally or alternatively employed. In particular, a resource block can be used as a basis, where a resource block can be exemplarily defined as a number of subcarriers or as a combination of a number of subcarriers and a number of time intervals such as OFDM symbols.

It is noted that the number smaller than the bundle size is preferably greater than one. These approaches provide a higher scalability as they enable selecting between the code rate reduction and transport block size increasing per scheduled transmission.

In accordance with another embodiment of the present invention, the scheduling information further includes a redundancy version, or a process number indication which indicates the number of the addressed ARQ process and at the same time the bundling indication.

However, it is noted that the present invention is not limited thereto and that other alternatives are possible. For instance, redundancy version having a predefined value together with different transmission power control command may indicate whether or not TTI bundling is applied for the transmission of the scheduled data. It may further indicate the number of TTIs to be bundled for the given transmission. Still alternatively, the channel state information request may be used to trigger TTI bundling instead of triggering the transmitting of the channel state information. This may be advantageous in configurations in which the channel state information requesting is not likely to be used such as MTC-terminal scenario. In general, the dynamic TTI bundling may be signaled in any kind of information related to transmission on the scheduled resources. It may be embedded within existing signaling fields by interpreting some of their values as on/off for the TTI-bundling and/or indicating the TTI-bundle size. In another alternative, TTI bundling with more than 1 subframe can be indicated only in case a first transmission of a transport block is indicated or used, where the details of the bundling method are further indicated according to at least one of the embodiments. However, also a new element in the scheduling information may be defined signaled specifically for switching on/off the bundling for the scheduled data in the scheduled transmission.

In accordance with another embodiment of the invention, a common acknowledgement (ACK or NAK) is transmitted after all subframes of a single TTI-bundle were received/checked/evaluated. Alternatively, individual ACK/NAK signaling may be applied for each subframe. Advantageously, when it is possible to successfully decode data based on received one or more subframes from a single bundle, a positive acknowledgement is transmitted to the data transmitter, and the data transmitter may stop transmitting the remaining subframes from the same bundle. In this way, the resources are utilized more efficiently. This approach is particularly advantageous when there is a delay or interval of more than one subframe between the subframes from the same bundle.

In accordance with an aspect of the present invention, a method is provided for transmitting data in a multicarrier communications system, transmission of data being performed in transmission time intervals, the method comprising: receiving scheduling information indicating resources on which the terminal is scheduled to transmit data and including a bundling indication for indicating whether the scheduled transmission is to be performed in one or more transmission time intervals; and transmitting the data in the scheduled resources in accordance with the received bundling indication.

In method for receiving data in a multicarrier communications system, reception of data being performed in transmission time intervals, the method comprising: receiving scheduling information indicating resources on which the terminal is scheduled to receive of data and including a bundling indication for indicating whether the scheduled reception is to be performed in one or more transmission time intervals; and receiving the data in the scheduled resources in accordance with the received bundling indication.

In accordance with another aspect of the present invention, a scheduling node is provided for transmitting data to a terminal in a multicarrier communication system in which the transmission of data is performed in transmission time intervals, the scheduling node comprising: a control information transmission unit for transmitting scheduling information indicating resources on which a terminal is scheduled to receive data, and including a bundling indication for indicating whether transmission time interval bundling is to be applied or not for the scheduled transmission to the terminal; and a data transmission unit for transmitting the data to the terminal in the scheduled transmission resources and in accordance with the transmitted bundling indication.

In accordance with another aspect of the present invention, a scheduling node is provided for receiving data from a terminal in a multicarrier communication system in which the transmission of data is performed in transmission time intervals, the scheduling node comprising: a control information transmission unit for transmitting scheduling information indicating resources on which a terminal is scheduled to transmit data, and including a bundling indication for indicating whether transmission time interval bundling is to be applied or not for the scheduled reception of data from the terminal; and a data reception unit for receiving the data from the terminal in the scheduled reception resources and in accordance with the transmitted bundling indication.

The method may further comprise a step of determining the size of the data for the scheduled transmission or reception based on the number of transmission time intervals in which the data is to be transmitted or received and based on a number of frequency resources effectively used for the scheduled transmission or reception.

In accordance with an advantageous embodiment of the present invention, the scheduling information further includes an inter transmission time interval indicating a delay between transmission time intervals belonging to the same TTI bundle.

In accordance with another advantageous embodiment of the present invention, a delay between the bundled transmission time intervals corresponds in its length to the time interval between two transmissions or receptions of data of a same ARQ process. This delay may be predefined or signaled as described above. It is noted that the delay may also have different values and need not necessarily be aligned to the round trip time associated with an ARQ or HARQ process(es), i.e. to the time between two transmissions pertaining to the same process if TTI bundling is not employed.

Preferably, the scheduling information includes a modulation indicator consisting of a plurality of bits and defined to be capable of taking: a plurality of values, each indicating a modulation scheme and/or size of the coded data to be employed for the scheduled transmission or reception in a single transmission time interval; and at least one value indicating that the scheduled transmission or reception is to be performed in a plurality of transmission time intervals.

The bundling indication may include number of transmission time intervals in which the scheduled transmission or reception is to be performed.

In accordance with an embodiment of the present invention, a bundling-enabling indicator is provided from the scheduling node to the terminal for indicating whether the bundling of transmission time intervals is enabled or not. The bundling indication is only included (by the scheduling node) or detected (by the terminal) in case that bundling is enabled by the bundling-enabling indicator. Preferably, the bundling-enabling indicator is signaled semi-statically.

In accordance with another aspect of the present invention, a computer program product comprising a computer-readable medium having a computer-readable program code embodied thereon is provided, the program code being adapted to carry out the present invention.

In accordance with still another aspect of the invention an integrated circuit is provided embodying any apparatus as described above.

The above and other objects and features of the present invention will become more apparent from the following description and preferred embodiments given in conjunction with the accompanying drawings in which:

FIG. 5A is a table illustrating an example of a modulation and coding scheme index in uplink supporting no bundling and 2-TTI bundling;

FIG. 5B is a table illustrating an example of a modulation and coding scheme index in uplink supporting no bundling and 2-TTI bundling;

FIG. 6 is a table illustrating an example of a modulation and coding scheme index in downlink supporting no bundling and 2-TTI and 4-TTI bundling supporting only QPSK;

FIG. 7 is a table illustrating an example of a modulation and coding scheme index in uplink supporting no bundling and 2-TTI and 4-TTI bundling and employment of a hopping flag;

FIG. 8 is a table illustrating an example of a modulation and coding scheme index in uplink supporting no bundling and 2-TTI bundling and inter-TTI interval values of 1 and 8;

Figure 10:
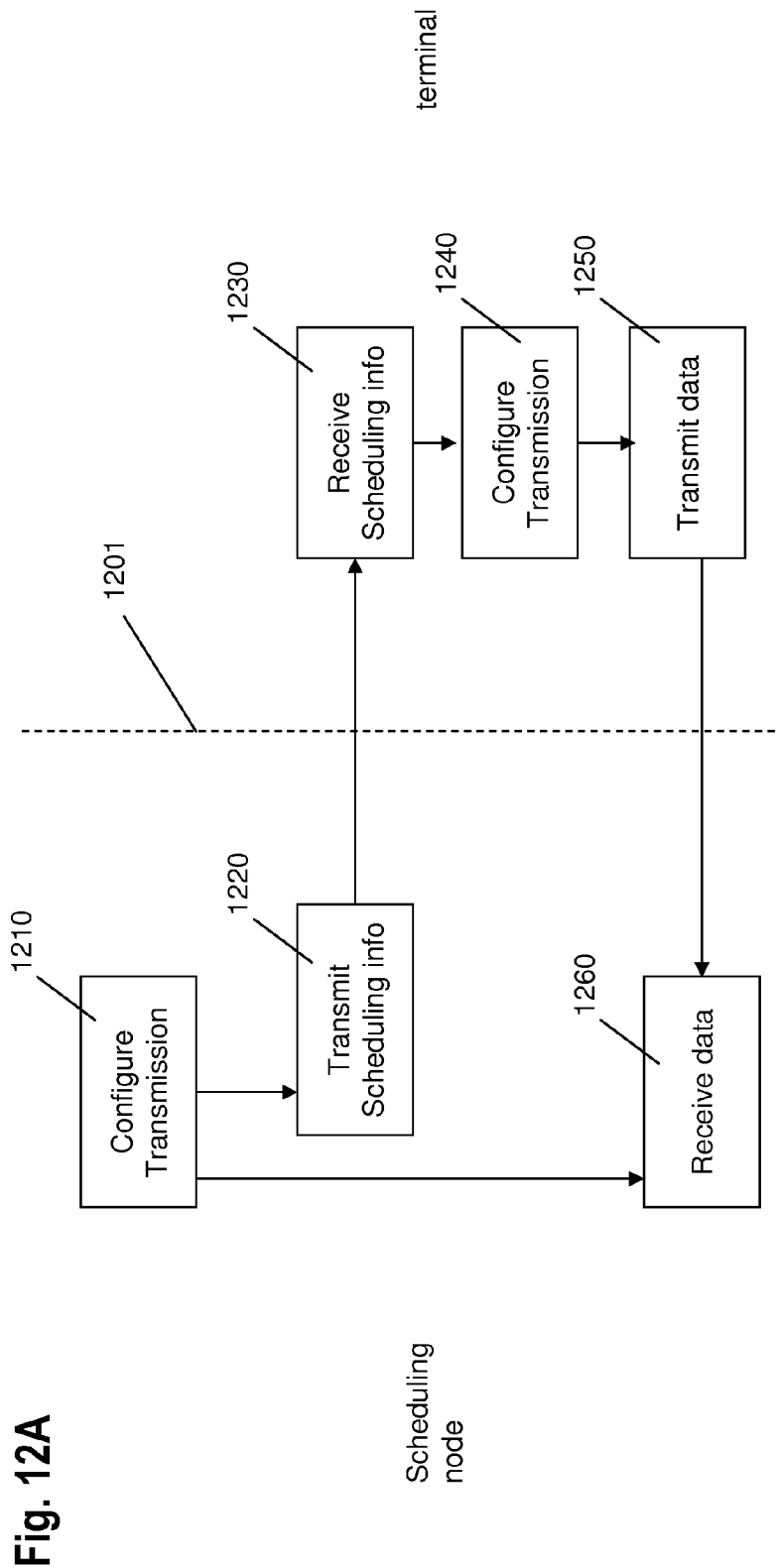
Figure 11:
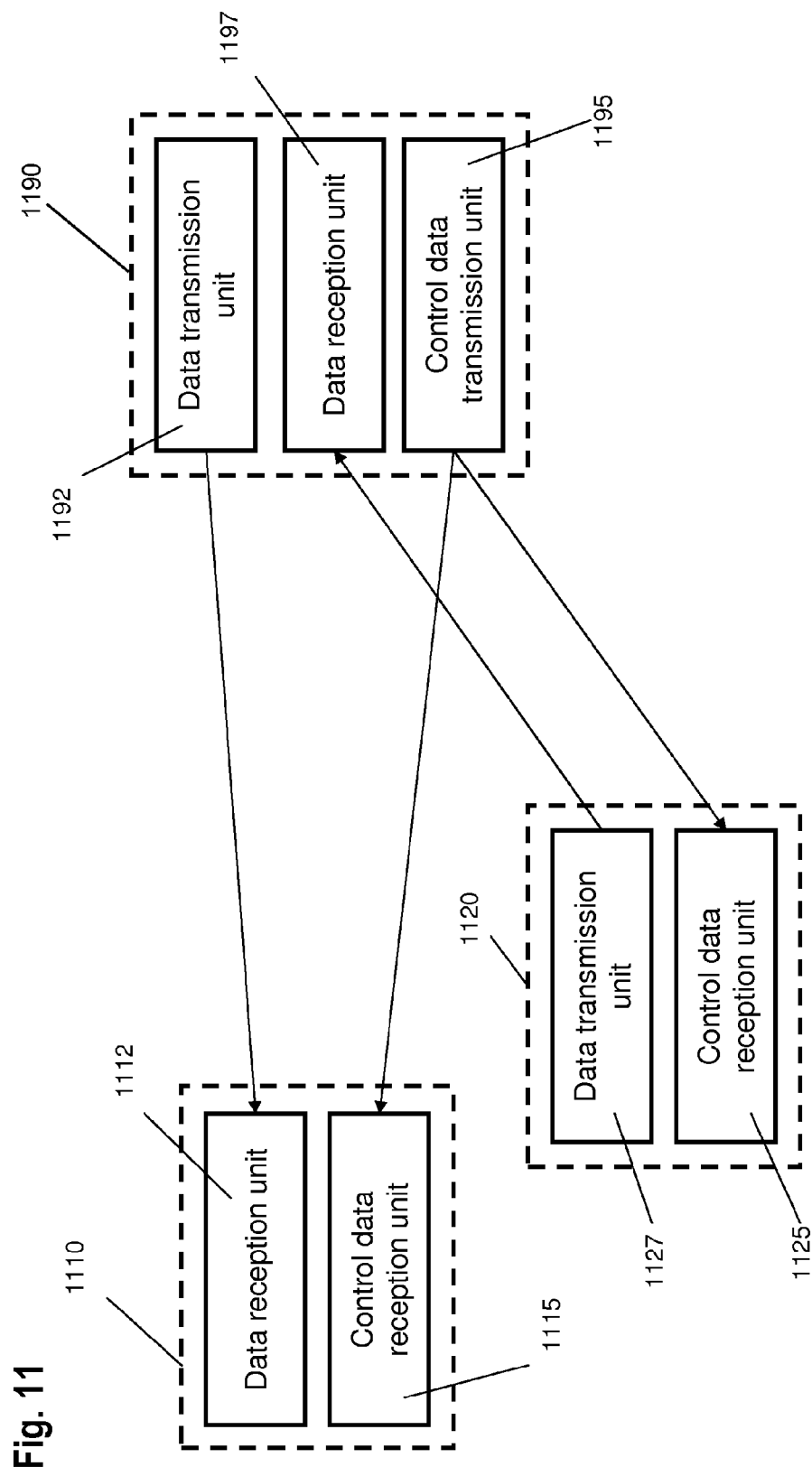
Figure 12B:
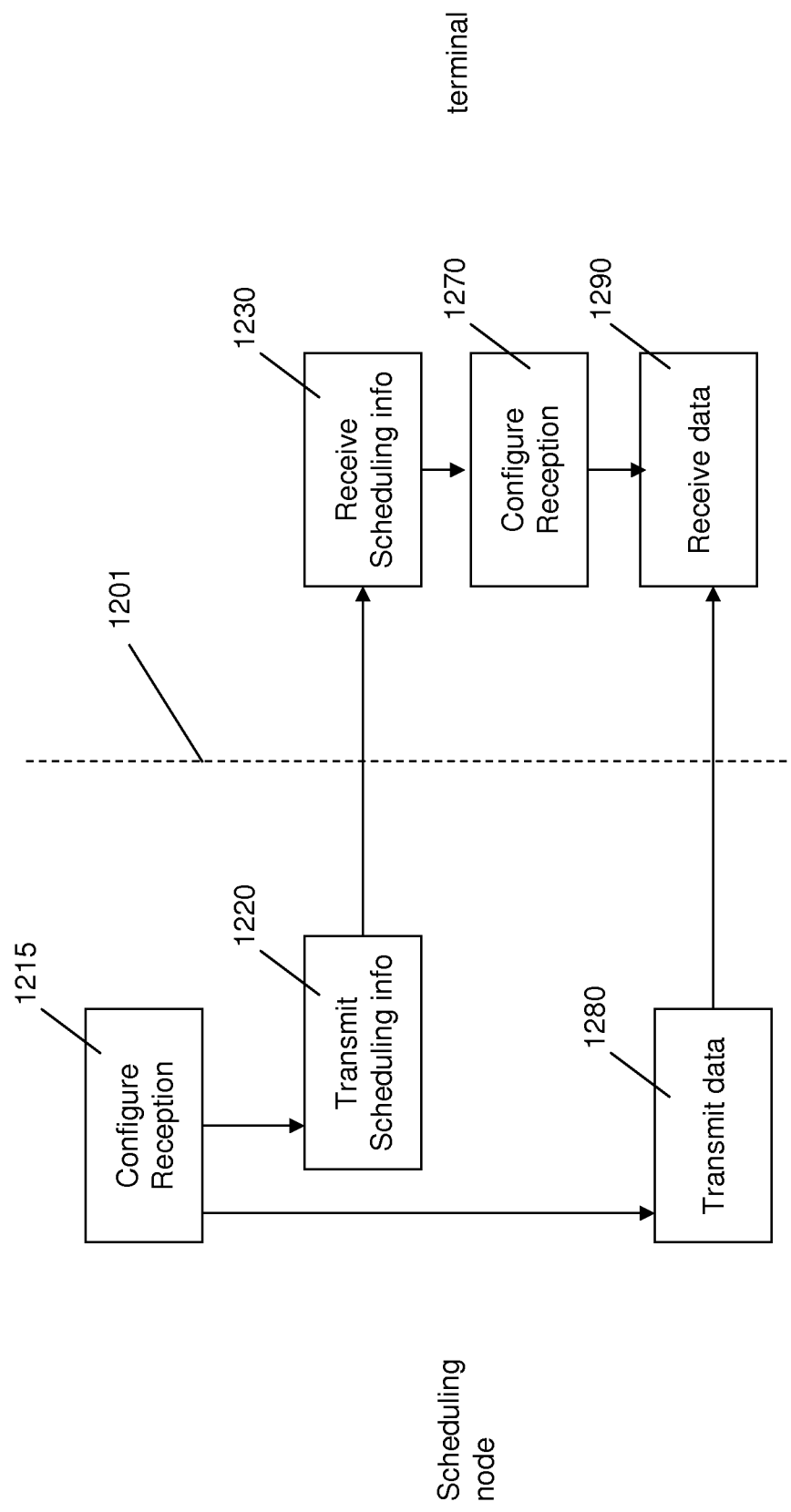

FIG. 9 is a table illustrating an example of a modulation and coding scheme index in downlink supporting no bundling and 2-TTI and 4-TTI bundling supporting both QPSK and 16-QAM;

FIG. 10 is a table illustrating an example of a redundancy version index assignment allowing signaling of the redundancy version for bundled TTIs and TTIs without bundling;

FIG. 11 is a block diagram illustrating examples of apparatuses according to various embodiments of the invention;

FIG. 12A is a flow diagram illustrating uplink data transmission involving methods according to the present invention; and FIG. 12B is a flow diagram illustrating downlink data transmission involving methods according to the present invention.

DETAILED DESCRIPTION

In accordance with the present invention, in order to enable an efficient transmission of data in some scenarios, transmission time interval (TTI) bundling may be configured for transmission of data in uplink and/or downlink shared channel. The dynamic transmission time interval bundling means that the usage or non-usage of TTI bundling is determined for any individually scheduled transmission (UL) or reception (DL) by means of the corresponding control signal that assigns the respective transmission or reception. Moreover, the number of bundled transmission time intervals and/or the delay between the bundled transmission intervals (measured in subframes) may be configurable.

The present invention may be advantageously employed for MTC. However, MTC is only an example and the present invention may be beneficially applied also to other type of communications and traffics as will be describes in the following.

Apart from the MTC, 3GPP deals with other study items, which relate, for instance, to coverage enhancements and to enhancements for diverse data applications.

In terms of coverage, the uplink transmission is the limiting factor. In particular, for applications such as voice over IP (VoIP), the physical uplink shared channel (PUSCH) is the limiting factor especially with relaxed performance targets for PRACH/Msg3. PRACH is a physical random access channel which serves for an initial access of the terminals to network. Message 3 (Msg3) is a scheduled transmission on PUSCH, which may include, for instance an uplink RRC connection request message, or the like. The physical uplink shared channel for a medium data rate performs poorer than other channels. The 3GPP is consequently studying possible coverage enhancements for medium rate and Voice over IP in uplink and also for Msg3.

In view of these study items, the dynamic bundling of a predefined number, N, of transmission time intervals may be beneficial. In general, the TTI bundling may be particularly efficient for transmission in bad channel conditions in order to avoid re-transmission delay and the related control overhead. With TTI bundling, the transmission of N times larger transport blocks would be enabled in transmission power limited cases than in the case without bundling.

A TTI bundling mechanism has been already employed in Releases 8 to 10 of LTE for uplink, mainly targeting low-rate VoIP services. The configuration of this TTI bundling has been performed semi-statically, i.e. via RRC protocol. With the bundling, protocol overhead due to packet segmentation for multiple hybrid ARQ processes may be avoided. In particular, in Releases 8-10, bundling of four consecutive subframes has been introduced. However, the bundling configuration only enabled the QPSK modulation and three or fewer assigned physical resource blocks.

In accordance with one aspect of the present invention, the bundling is configured, indicated, and performed dynamically. Employing dynamic bundling is particularly beneficial for the cases in which traffic intervals are about 0.5 seconds or longer, since in such scenarios the channel states between the respective transmissions have a low correlation due to the time-variation of the fading. Therefore, the channel states are almost independent. Such traffic occurs, for instance, for periodic transmission of application data such as status polling or update. This kind of traffic can be typically found in the MTC applications. The dynamic bundling is further beneficial for terminals with variable transport block sizes used, for instance, in variable bit rate applications, such as when multiple traffic sources are transmitted or received in parallel. Moreover, the dynamic bundling may be beneficial for combinations of the above mentioned traffic models such as for terminals with small to medium rate bursty traffic. An example may be a Smartphone periodically checking for emails, social network updates, uploading the location information, etc.

Figure 1:
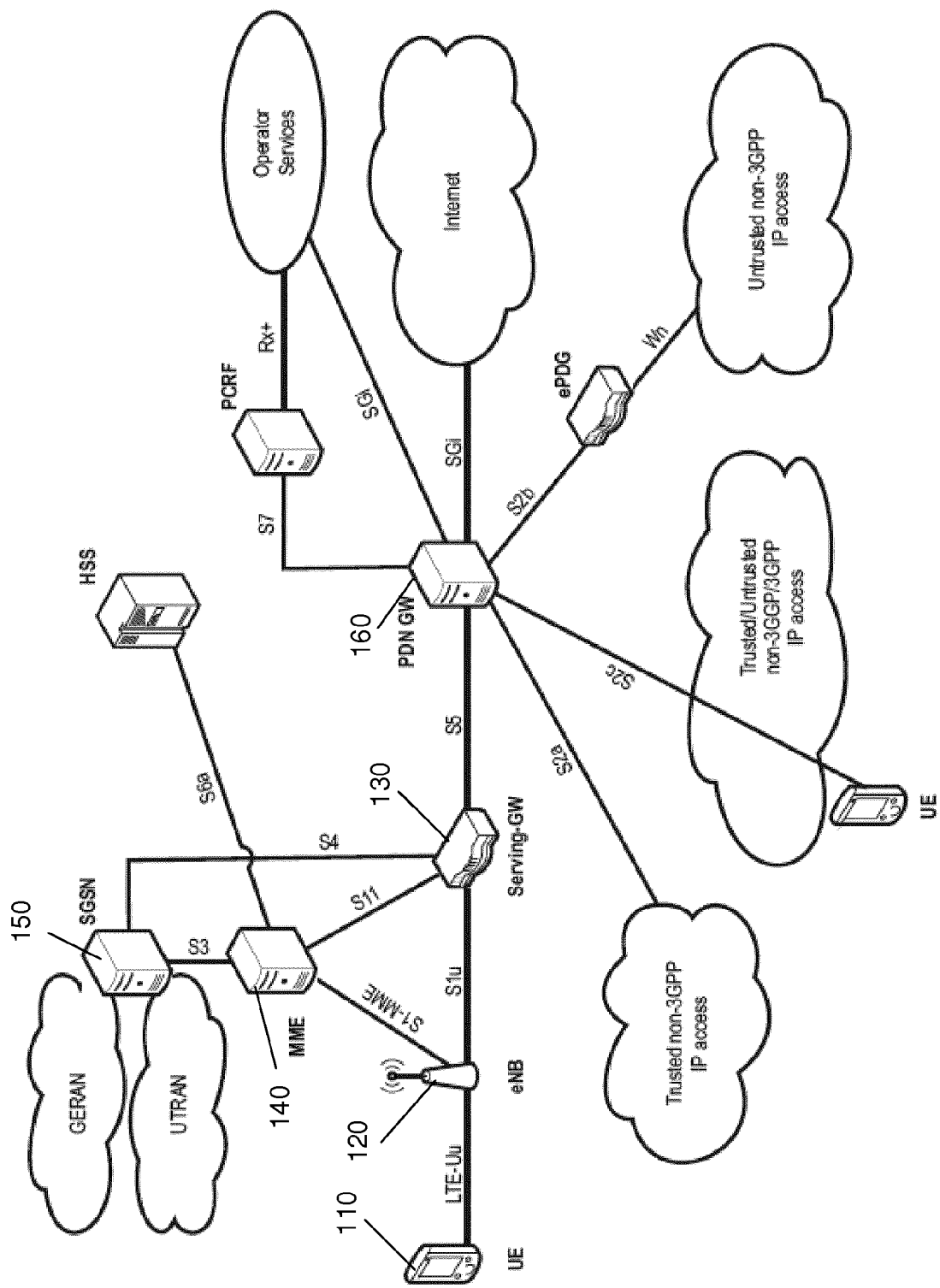
FIG. 1 is a schematic drawing showing the general structure of a sub-frame on a downlink component carrier defined for 3GPP LTE.
Figure 2:
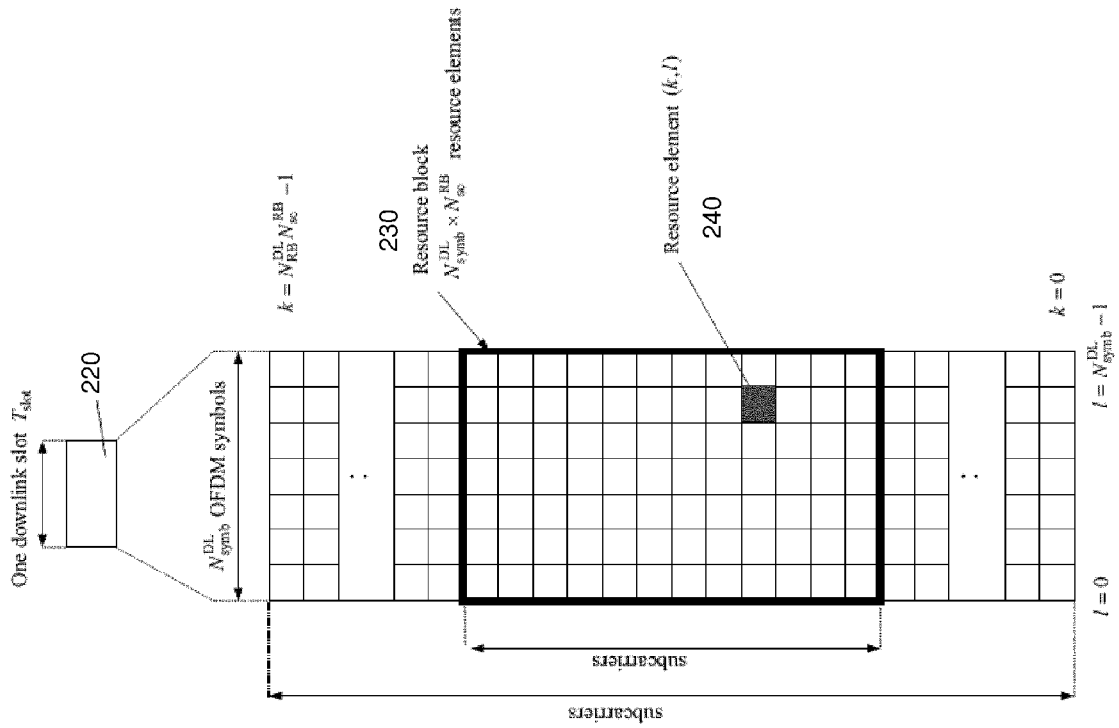
FIG. 2 is a schematic drawing illustrating an example of a resource grid in LTE.
Figure 3:
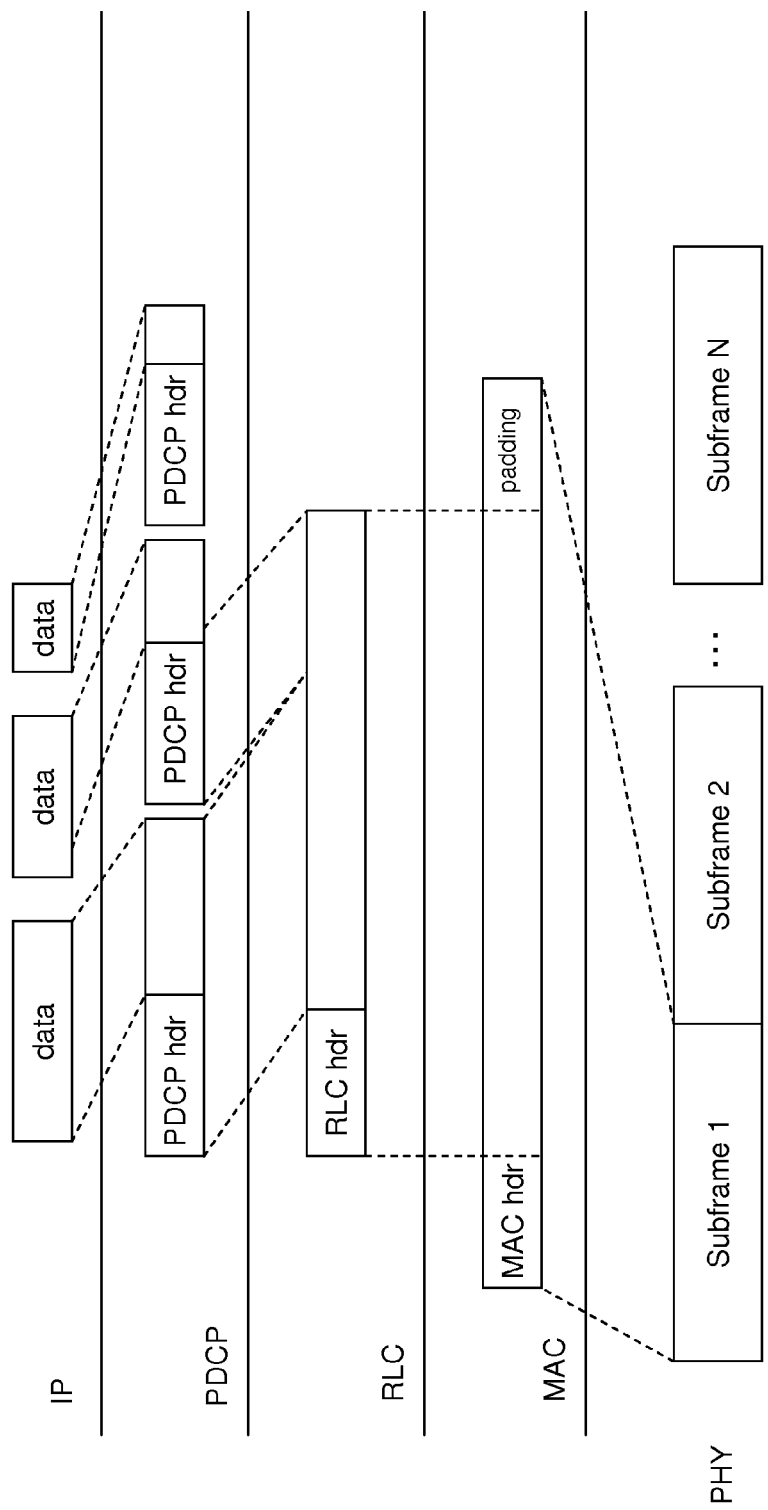
FIG. 3 is a schematic drawing illustrating an example of data mapping onto a physical channel in LTE.
Figure 4:
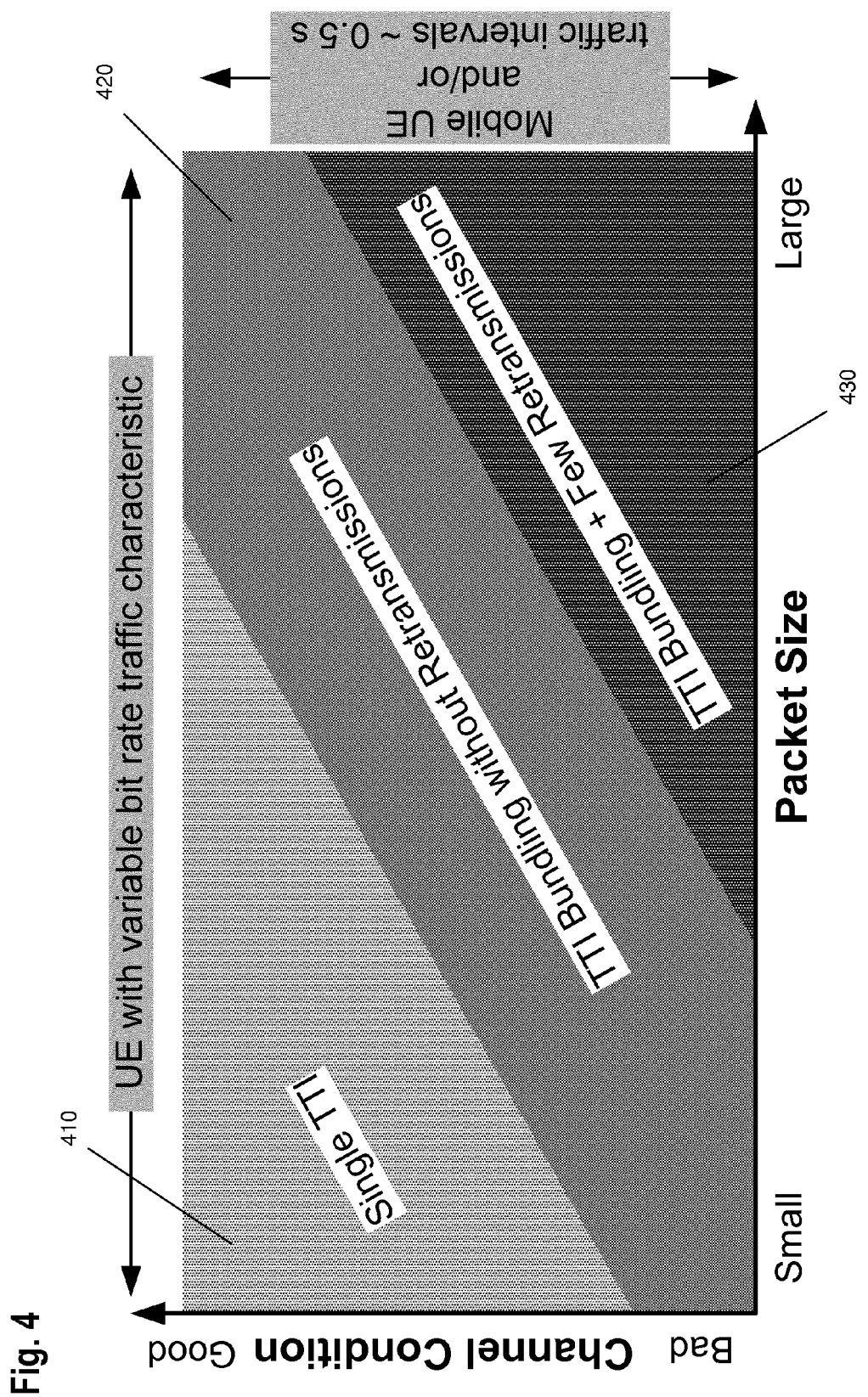
FIG. 4 is a schematic drawing illustrating suitability of dynamic transmission time interval bundling for transmission of different packet sizes over channel in good/bad condition.

FIG. 4 schematically illustrates scenarios, in which the dynamic TTI bundling may be beneficial. It distinguishes between the TTI bundling with and without re-transmissions. If the channel conditions are good and the packet sizes generated are small to medium, a single TTI concept 410 is suitable. For rather poor channel conditions and smaller packet sizes, or in better channel conditions but larger packet sizes, TTI bundling without re-transmissions 420 could be more efficient. Finally, for rather large packet sizes and poor channel conditions, the TTI bundling may be combined with a few re-transmissions 430.

The semi-static TTI bundling, as applied in Releases 8 to 10 of LTE for uplink voice over IP, results in a delay caused by the controlling overhead. In particular, it is necessary to transmit an RRC packet with the bundling settings, to acknowledge the settings, and to activate the bundling. The deactivation and activation time for the RRC commands has not been specified in the 3GPP, consequently there is an uncertainty delay involved since it cannot be predicted in detail at what time exactly the terminal can apply the configuration, i.e. in this case to (de-)activate the bundling. This uncertainty is partly due to the implementation-specific time that is required to successfully detect and process the RRC packet at the terminal, and also partly due to the possible misunderstanding between base station and terminal whether/when the RRC packet has been detected correctly due to acknowledgement errors. Accordingly, the base station should wait for up to a few radio frames until it can be ensured that a terminal has applied the RRC command.

This delay is avoided when dynamic TTI bundling is applied. For instance, in accordance with an embodiment of the present invention, the TTI bundling signaling is transmitted in the PDCCH, for instance in the DCI. Such dynamic TTI bundling also does not require any delay for starting the bundling. The timing relation between the PDCCH and the corresponding PDSCH and PUSCH transmission is exactly specified. Accordingly, there is no activation time uncertainty about whether or not the TTI bundling is applied for the assigned transmission. In addition, as the dynamic bundling indication is only applicable to the correspondingly scheduled transmission (e.g. PDSCH for downlink or PUSCH for uplink), there is no bundling deactivation command required and therefore no delay for a deactivation command is incurred by a dynamic TTI bundling indication.

Moreover, apart from the delay, the semi-static bundling configuration further requires additional RRC signaling overhead. In particular, several subframes and PDCCH, PDSCH, PUSCH or PUCCH cycles on the physical layer are required until the RRC message has been delivered. In particular, PDCCH is employed to indicate a PDSCH transmission, PDSCH transmission is used to convey the RRC message, PUCCH is used to send a lower-layer acknowledgement from the terminal to the base station, PDCCH is used to indicate a PUSCH transmission, PUSCH transmission is used to convey the RRC acknowledgement message. In the worst case, each of these aspects might need to be done several times due to error-cases in the transmission chain. The relatively large RRC overhead is particularly critical for short bursty traffic and for energy saving applications. Since the terminal needs to be longer in the active time, the energy saving benefits from the DRX is also reduced.

As can be seen from the above comparison between the dynamic and semi-static TTI bundling, the dynamic TTI bundling provides benefits especially for low-cost MTC terminals, for coverage enhancements and also for enhancements from diverse data applications which form currently study items in the 3GPP.

FIG. 11 illustrates examples of devices in accordance with the present invention. In particular, FIG. 11 shows two terminals 1110 and 1120. The terminal 1110 is a terminal capable of applying the dynamic bundling in the downlink. The terminal 1120 is a terminal capable of applying the dynamic bundling in the uplink. As is clear to those skilled in the art, a single terminal may be provided capable of applying bundling in both uplink and downlink direction. Such terminal would then include the functional blocks of both terminals 1110 and 1120. FIG. 11 further shows a scheduling node 1190. The scheduling node 1190 schedules the transmission and reception of data by the terminals. The scheduling node may be a network node such as a base station or a radio network controller or the like. For instance, in LTE the eNodeB performs the dynamic scheduling for the shared channels in downlink (PDSCH) and in uplink (PUSCH). However, it is noted that in general, in LTE or other systems the scheduling may be performed by a different node or for other downlink or uplink channels, which is still no problem for the employment of the present invention in such a system.

In accordance with an embodiment of the present invention, a terminal 1120 is provided for transmitting data in a multicarrier communication system in which the transmission of data is performed in transmission time intervals. The terminal 1120 includes a control information reception unit 1125 for receiving scheduling information indicating resources on which the terminal is scheduled to transmit data, and including a bundling indication for indicating whether transmission time interval bundling is to be applied or not for the scheduled transmission. Moreover, the terminal comprises a data transmission unit 1127 for transmitting the data in the scheduled resources and in accordance with the received bundling indication.

The terminal may be a mobile or a static terminal. Advantageously, the terminal is an MTC-capable terminal. However, the terminal may also be a normal user terminal or a relay node. The multicarrier communication system may be a wireless communication system supporting orthogonal frequency division modulation (OFDM), such as LTE. However, the present invention is not limited thereto and the dynamic bundling of the present invention may be applied to any communication system supporting dynamic scheduling on a shared data or control channel. The transmission time interval here refers to a predefined processing time interval in which the data are provided to the physical layer for transmission in a subframe (predefined duration on a radio interface). For instance, the length of the TTI in LTE is one millisecond and one TTI is mapped on the physical resources of one subframe as already described in the background section. It is noted that these values apply for the current LTE specifications. However, the present invention is applicable for any timing of the radio interface.

The enabling of the dynamic bundling may be signaled to a terminal by a semi-static configuration, such as RRC configuration. In order to achieve this, a bundling-enabling configuration parameter may be defined. The bundling indication is only included (by the scheduling node) or detected (by the terminal) in case that bundling is enabled by the configuration parameter. It is noted that the dynamic bundling may be configurable as described above. However, this is not to limit the present invention. In alternative embodiments, the dynamic bundling is always enabled, meaning that it is always signaled per scheduled data whether or not the bundling is employed for the respective scheduled data. Moreover, in the case where the bundling-enabling configuration parameter is defined, it does not necessarily have to be configured by the RRC. Any other type of signaling may be used. The term "semi-statically" here refers to the fact that the signaled value applies for more than one scheduled transmissions and/or receptions.

When the dynamic bundling is enabled, the number of bundled TTIs for a single assigned transmission (from base station to terminal or vice versa) is then indicated to the terminal in each transmission assignment that contains the scheduling information. The number of bundled TTIs in this case may also be one, meaning that for this particular transmission no bundling is applied and only a single TTI is available for the transmission. The number of bundled TTIs may further involve a number of TTIs such as 2, 3, 4, 8 or other. It should be noted that enabling the bundling does not automatically mandate bundling; rather when bundling is disabled, no bundling is allowed. Conversely, if bundling is enabled, then bundling is allowed, but whether bundling is then actually used for a transmission/reception is a function of the bundling indication.

It is beneficial when the dynamic bundling indicator is provided together with the scheduling information. For instance, the dynamic bundling indication together with the scheduling information may be provided within the downlink control information (DCI) as defined by the LTE and which can be transmitted on PDCCH or other control channel(s).

The bundled TTIs may be chosen to be consecutive with respect to the timing of the radio interface. For instance, in the LTE this means that the bundled TTIs are mapped to consecutive subframes. However, an extra time diversity may be achieved if the bundled TTIs are distributed with respect to the timing of the radio interface. For instance, in LTE this means that the bundled TTIs are mapped to subframes that are not adjacent to each other. Any distribution may apply. For instance, a predefined delay may separate each of the subframes from its nearest subframe belonging to the same bundle. Preferably, the predefined delay is an integer multiple of a non-bundled TTI. Alternatively, two time intervals may be mapped on neighbouring subframes and a third TTI may be mapped such that it is not adjacent to any of these two TTIs. In general, the distributed mapping assumes that at least two of the bundled TTIs are not mapped into the adjacent subframes.

Advantageously, the scheduling information further includes an inter transmission time interval which indicates the delay between the transmission time intervals which are bundled, i.e. belonging to the same bundle according to a single scheduling information. Depending on the convention, transmission in two subsequent subframes (at least in FDD) could be interpreted as having an inter-TTI interval of 1 (since the difference of subframe indices between two subsequent transmissions is 1) or alternatively as an inter-TTI interval of 0 (since there is no 'vacant' subframe between the two transmissions). Notwithstanding the second convention, in the following we will use only the first convention for clarity.

Alternatively, the inter transmission time interval may be predefined and may correspond in its length to the time interval between two transmissions of data of the same ARQ process. In LTE for FDD, this would be the 8 millisecond interval which enables the alignment with the regular hybrid ARQ timing. Moreover, the inter TTI hopping between the bundled TTIs may be employed.

In case of TDD, it should be noted that in contrast to FDD, not all subframes are available for uplink as well as for downlink transmissions. Rather, the available subframes are split between uplink and downlink subframes (as well as potentially special subframes, during which the transmission between uplink and downlink or vice versa can occur). For LTE, the corresponding UL/DL configuration is indicated in Table 4.2-2 of 3GPP TS 36.211 v10.4.0. With respect to TTI bundling, this has consequences particularly for the issue of adjacent bundles or with an inter transmission time interval as outlined hereafter. For simplicity, only the uplink bundling case is described in detail. The downlink case can be derived from this by those skilled in the art mutatis mutandis.

In case than in TDD a bundle of adjacent subframes is indicated, only the subframes that are available for uplink transmission should be taken into account. For example, using UL/DL configuration #1 from the cited 3GPP specification, only subframes #2, #3, #7, #8 are designated as uplink subframes; this pattern repeats every 10 subframes, so that the available uplink subframes would be #2, #3, #7, #8, #12, #13, #17, #18, #22, #23, etc. Consequently, if bundling is indicated for 4 consecutive subframes starting at subframe #2, then the terminal should assume that subframes #2, #3, #7, #8 are forming the corresponding bundled subframe. While these are not adjacent in the time domain sense, they are still adjacent with respect to the available uplink transmission opportunities. If, on the other hand, the same configuration is applied with an inter TTI interval as indicated in FIG. 8, and the 4-TTI bundled transmission should start at subframe #2, then the terminal should assume that subframes #2, #22, #42, #62 are forming the corresponding TTI bundle. So in this case, every 8th uplink transmission subframe is used for that TTI bundle. Another TTI bundle would be formed e.g. by subframes #3, #23, #43, #63 and so forth.

The bundling indicator can be a separate field (or bit) within the scheduling information, or can be beneficially incorporated into other fields (or bits) in order to enable a small scheduling information payload size. In the following, advantageous embodiments of incorporating the bundling indicator into other fields of are introduced and described.

The scheduling information may include a modulation indicator, which consists of a plurality of bits and which may be defined to take values, among which:
  a plurality of values is included, each of which indicates a modulation scheme and/or size of the coded data to be employed for the scheduled transmission (UL) or reception (DL) in a single transmission time interval, and
  at least one value indicates that a scheduled transmission or reception is to be performed in a plurality of transmission time intervals (bundled).

In this way, the bundling information (or indicator) is included in the modulation indicator, where it should be noted that it is generally irrelevant whether the values that indicate that a scheduled transmission or reception is to be performed in a plurality of transmission time intervals share a certain bit value (e.g. the most significant bit value of the modulation indicator is 1 for bundling) or not. However, for an easy detection whether bundling is to be performed or not it may indeed be preferable to have a predetermined bit that works as an on/off switch depending on its value.

In particular, in LTE an MCS index table is used for indicating modulation scheme (such as modulation order) and/or size of the coded data (transport block size index). The MCS index table may also include redundancy version indication, which indicates a value that is used for rate matching the output of a forward error correction (FEC) encoder such as a turbo or convolutional encoder. The redundancy version may correspond to an index to a coded bit position within the encoded information that is to be used as the start for the information that is to be transmitted, e.g. an index to a position in a buffer. A separate new data indicator (NDI) may be included for indicating a new data (first transmission). Moreover, the scheduling information may also include the index to an addressed ARQ (HARQ) processes. It is noted that in LTE, hybrid ARQ is employed using error correction codes employing generally different redundancy versions at different retransmission for an improved coding performance. However, for the purposes of the MTC terminals or general—for the improvement of the present invention—an ARQ without different redundancy versions may also be applied, e.g. assuming that the redundancy version for all transmissions is always zero (or another defined value), regardless whether the respective transmission is a first transmission of a transport block or a retransmission. The present invention is also applicable when no ARQ is applied, which may be beneficial in some scenarios as shown by reference numeral 420 and described with reference to FIG. 4.

As shown above, the TTI bundling is mainly attractive for mobile terminals with small to medium rate bursty traffic, terminals close to the cell edge, terminals experiencing power limitation (for instance, in uplink) or low cost terminals with a bandwidth or data rate limitations, such as MTC terminals. The higher modulation levels cannot be efficiently exploited in these scenarios since the channel conditions are typically not sufficient for it. For instance, 64 QAM and possibly also 16 QAM may be unsuitable for these scenarios and/or applications.

In LTE, the MCS levels between 0 to 9 in downlink and between 0 to 10 in uplink usually represent employing of the robust QPSK modulation (for some exceptions, refer to above cited TS 36.213, sections 7 and 8 for downlink and uplink, respectively). The remaining levels specify configurations with the higher-level modulations. Accordingly, the attractive levels in the MCS table for the power limited are concentrated at the lower indices. This provides the possibility of using the remaining levels that are usually corresponding to higher level modulations for dynamic signaling of the bundling without negatively impacting the system performance.

In accordance with an advantageous embodiment of the present invention, a portion of the MCS table is used to signal whether or not dynamic bundling is employed for the scheduled data. In this way, the MCS index serves also as the bundling indication. In addition, more options for indicating the number of bundled TTIs may be included within the MCS higher level modulation states, such that at least two numbers of bundled TTIs greater than 1 can be indicated. The remaining part of the table may correspond to the current MCS table and indicate the modulation level for the single-TTI transmission, i.e. transmission without TTI bundling (which could be seen as TTI bundling with a number of bundled TTIs equal to 1).

FIGS. 5A and 5B illustrate an example of an MCS table applicable for the dynamic uplink TTI bundling. In comparison with the currently in LTE applied table, a new column "subframe bundling size" is added for indicating the number of bundled TTIs. The original LTE MCS table has 32 entries with indices 0 to 31. In accordance with this embodiment, the MCS table for single-TTI transmission is restricted to 16 MCS levels indicating the transport block size index, and the order of modulation. For these first 16 levels, the TTI bundling size is one, meaning that no bundling is applied. This corresponds to entries 0 to 12 relating to new data transmission. Entries 13 to 15 indicate the redundancy version in case of retransmission without bundling, i.e. where the retransmission itself is transmitted in a single TTI, no matter whether bundling has been employed for earlier transmissions of the same data packet.

Entries 16 to 31 of the Table in FIG. 5A correspond to duplication of entries 0 to 15 with the exception of the value of the "subframe bundling size". Entries 16 to 31 are thus used to indicate that the TTI bundling of two TTIs is to be applied. For instance, levels 9 and 25, levels 10 and 26, etc use the same MCS (i.e. same modulation order and same TBS Index) but different bundling. The entries 16 to 31 are new (different) in comparison to the Release 8-10 MCS level table. As a consequence, the transport block size which may be supported is limited to the equivalent of TBS Index 11, which according to Table 7.1.7.2.1-1 in TS 36.213 is up to 4968 bits with 25 assigned PRBs. It should be noted that the transport block size is a function not only of the TBS index but also of the number of assigned PRBs. In this example, the re-transmissions can be triggered for both configurations with or without bundling, corresponding to the respective levels 13 to 15 and 29 to 31.

Alternatively or in addition, the PHICH or another channel carrying a hybrid ARQ indicator (HI) may be used for triggering retransmissions (for simplicity, the following only describes the PHICH case). Whether single TTI or bundled TTI re-transmissions are triggered by PHICH can be semi-statically configured by higher layers, or can be part of the PHICH signal, or can be dependent on the bundling method that has been employed for the first transmission or the latest (re-) transmission of the same packet. For example, the higher layers can configure that a negative acknowledgement received on PHICH always triggers a retransmission without bundling.

Alternatively, it can be configured to always trigger a retransmission with bundling.

Alternatively, a first PHICH value triggers a retransmission without bundling, a second PHICH value triggers a retransmission with bundling, and a third PHICH value does not trigger a retransmission.

Alternatively, a negative acknowledgement received on PHICH triggers a retransmission that uses the same bundling size (including 1, i.e. no bundling) as the first transmission of the same packet.

Alternatively, a negative acknowledgement received on PHICH triggers a retransmission that uses the same bundling size (including 1, i.e. no bundling) as the latest transmission (i.e. including previous retransmissions that may have been triggered by HI or DCI) of the same packet.

Using the HI to trigger retransmissions is mainly useful to save radio resources, because an HI payload is substantially smaller than a DCI payload. In addition, if the HI is used to indicate retransmissions without bundling (irrespectively if this behaviour is fixed or configurable), it is possible to avoid the usage of MCS index entries for triggering retransmissions without bundling, such that for the case without bundling more MCS levels can be used and consequently the largest TBS index without bundling can be higher than the largest TBS index with bundling in the same MCS table.

It should be further noted that under certain circumstances, MCS level 29 is used to indicate a so-called "CSI-only" transmission (details see TS 36.213, section 8.6 and subsections). In order to benefit from TTI bundling also for such a CSI-only transmission, it is therefore preferable to use in such cases not only MCS=29 as a condition for CSI-only, but also e.g. MCS=13 (using the example above, or any other MCS index that indicates redundancy version 1). As the usual behaviour is that MCS=29 (together with other criteria) indicates a CSI-only transmission without bundling (i.e. bundling size=1), in case of enabled bundling it might further be preferable that MCS levels 29-31 trigger retransmissions without bundling (i.e. the same as in Release 8-10 versions of 36.213) and e.g. MCS levels 13-15 trigger retransmissions with bundling.

Accordingly, FIG. 5B differs from FIG. 5A in that the bundling size in entries 13-15 and 29-31 is exchanged. Accordingly, the entries 13-15 trigger retransmission with bundling and entries 29-31 trigger retransmissions without bundling. Thus, compatibility with the current table order may be achieved.

It is noted that especially for scenarios such as MTC terminals, the bundling may be beneficial not only for the uplink but also for downlink scheduling.

In the previous example, if bundling is disabled by higher layers, then an MCS table as e.g. in TS 36.213 Table 8.6.1-1 is used, where all entries indicate no bundling. If bundling is enabled by higher layers, then an MCS table as outlined above and exemplarily shown in FIG. 5 is used. From this perspective, the e.g. RRC signal to enable/disable bundling effectively determines which of at least two MCS tables should be used, or at least it switches between at least two possible interpretations of an MCS table. The above can also be extended to provide e.g. a total of three or more different MCS tables, out of which one is exclusively indicating no-bundling transmissions, and where other MCS tables consist of different bundling interpretations (e.g. according FIGS. 5 and 7) that may e.g. differ in the number of indicateable bundling sizes, and/or number of indicateable inter transmission time intervals, and/or the maximum TBS index that can be indicated.

In accordance with another embodiment of the present invention, a terminal 1110 is provided for receiving data in a multicarrier communication system, in which the reception of data is performed in transmission time intervals. Such a terminal 1110, similarly to the terminal 1120 capable of uplink bundling, includes a control information reception unit 1115 for receiving scheduling information related to resources on which the terminal is to receive data and a bundling indication for indicating whether the scheduled reception is to be performed in one or more transmission time intervals (whether TTI bundling is applied to the reception). Such a terminal 1110 further includes a data reception unit 1112 for receiving the data in the scheduled resources in accordance with the received bundling indication.

The above described features of the scheduling information and/or the bundling indicator apply also for the downlink scheduling. In particular, the bundling indication may include a number of bundles TTIs. The scheduling information may further include the inter TTI delay indicating the delay between the subframes to which the bundled TTIs are mapped. The delay is not necessarily signaled, it may be predefined and may correspond to the (H)ARQ timing or to a scheduling cycle. The application of the predefined delay may, however, also be signaled.

FIG. 6 illustrates an example, in which similarly to the example described with reference to FIG. 5, a portion of MCS table as defined in the LTE system is used to signal bundling indication. In particular, the MCS table is restricted to QPSK modulation and includes the TTI bundling indication "subframe bundling size". For this configuration, the transport block size is limited to up to 4008 bits with 25 assigned PRBs. Entries 0 to 9 correspond to the originally included entries. They signal that no subframe bundling is applied. Entries 10 to 19 correspond to duplicated entries 0 to 9, but the subframe bundling size is 2, meaning that two TTIs are bundled. Similarly, entries 20 to 29 of the table correspond to duplicated entries 0 to 9 with bundling size 4, meaning that four TTIs are bundled. Accordingly, levels 8, 18 and 28 employ the same MCS but different bundling. In this case, the re-transmissions can be triggered with or without bundling corresponding to entries 30 and 31 in the MCS table. Preferably, level 31 triggers a re-transmission only with 2 TTI bundling since it is unlikely that the re-transmission with four bundled TTIs is attractive for the system. Alternatively, as described also for the uplink example, the triggering of a single TTI or bundled TTI re-transmissions may be performed by PHICH.

As can be seen from the above examples, the bundling indication is not necessarily a separate field to be signaled. In the scheduling information, a modulation and coding scheme is signaled by a single index (MCS index in the tables). Each of the indexes has assigned a configuration including also a value of the bundling indication ("subframe bundling size" in TTI units) and defined by a table such as the tables described with reference to FIGS. 5 and 6. However, the present invention is not limited to such a configuration. It is noted that the bundling indication may also be signaled separately in a field of a message transmitted from the scheduling node to the terminal. The field may be a flag of one bit for switching off/on the bundling for the given transmission. It may also be a field of more bits also indicating the number of bundled TTIs. It may also be a field indicating the inter-TTI delay. Such a field (or bit) is then preferably only present in the scheduling information in case that bundling is enabled by higher layers. Alternatively, the field (or bit) is always present and therefore includes (or replaces) the higher layer TTI bundling enable message; in such a case, a bundling indicator indicating a bundling size of 1 TTI implicitly disables TTI bundling, while a bundling indicator indicating a bundling size of >1 TTI implicitly enables TTI bundling.

FIG. 7 shows another example of an MCS table which may be used to signal the MCS index for cases with and without bundling in uplink. In particular, the assignments without TTI bundling can still be used to assign beside the QPSK modulation also the 16-QAM modulation transmissions which may be beneficial for instance in case of channels with a decent quality. In particular, the entries under indices 0 to 10 specify order 2 of the modulation meaning the QPSK. The entries under indices 11 to 14 specify order 4 of the modulation meaning the 16-QAM. All entries 0 to 14 specify transmission without bundling. The entries 15 to 28 specify order-2 modulation (QPSK) and application of TTI bundling. In particular, entries 15 to 21 indicate bundling over 2 TTIs, and the entries 22 to 28 indicate bundling over 4 TTIs.

The transport block size restrictions in this way without bundling is therefore less than in the example described with reference to FIG. 5. The size of the transport blocks may be 130% of the one shown in FIG. 5. The transport block size restriction for the cases with bundling is somewhat higher, but still allows up to 1.3 megabits per second at 5 MHz. In particular, the maximum transport block size is 53% of the transport block size using the MCS index table of FIG. 5A or 5B.

It may be noted that the mapping from MCS index to TBS index and therefore the corresponding transport block size can be alternatively independent of the modulation order that is chosen. The modulation order is mainly affecting the amount of forward error correction redundancy that can be employed for a transport block. As a consequence, in case TTI bundling is enabled, it is possible that the modulation order is by definition set to 2 (i.e. QPSK), overruling the corresponding entry in the MCS table. For example, in FIG. 7 from the table the MCS index 12 corresponds to a modulation order of 4 and a TBS index of 11. If TTI bundling is enabled and using the just described method, MCS index 12 would still correspond to TBS index 11 but with a modulation order of 2. This alternative way of handling the modulation order as a function of the TTI enabling configuration is applicable to downlink as well as uplink.

The example of FIG. 7 shows, in addition, a hopping flag table in which a hopping flag is employed to configure the bundling interval in order to allow increased time diversity. A hopping flag in the LTE context up to Release 10 is present in all DCI formats that assign uplink transmissions; in some DCI formats that assign downlink transmissions, there is a flag to decide between a localised and distributed transmission, where the localised method is similar to no-hopping and the distributed method is similar to hopping. Consequently the method shown in the hopping flag table can be applied to the localised/distributed flag mutatis mutandis. Preferably, in the bundling case, the hopping (which may be inter-subframe and/or intra-subframe hopping; or instead of hopping the distributed transmission, as applicable) should always be used in order to increase the frequency diversity effect of the corresponding transmission. It should be clear to those skilled in the art that in future LTE releases or other communication systems corresponding flags may be present using different names but providing a similar functionality. It is noted that the hopping flag may be signaled also in any other embodiments and examples describes herein above and below.

FIG. 9 shows an example of an MCS table that can be applicable to downlink TTI bundling. In comparison with the example described with reference to FIG. 6, this example enables bundling over two and bundling over four TTIs within the same table. The assignments without TTI bundling shown in entries from 0 to 15 can still be used to assign 16-QAM transmission except for the QPSK transmission. In particular, entries 0 to 9 indicate QPSK and entries 10 to 15 indicate 16-QAM. It is noted that this is only an example and that more or fewer entries may be dedicated to QPSK and 16-QAM, respectively.

Enabling a higher modulation order and/or a higher TBS index for the no-bundling case than for at least one TTI-bundling size case within the applicable table is particularly beneficial to enable transmissions with a high spectral efficiency and/or a high data throughput in case that the channel offers the required capacity. If the enabling and disabling of TTI bundling is performed semi-statically, i.e. a configuration persists usually for several subframes or even radio frames, the channel conditions may still fluctuate such that bundling could be switched off at least temporarily in order to enable transmissions with a high spectral efficiency. However, since this requires the exchange of configuration messages, this incurs overhead which is particularly unreasonable if frequent switching back and forth is required. In order to circumvent this problem, the MCS table employed if bundling is enabled contains modulation order and/or TBS indices for at least one non-bundling entry (i.e. where the bundling size is 1) that is not available for at least one bundling size greater than 1.

The transport block size restriction is therefore not as critical as in the example of FIG. 6 for the non-bundling entries (i.e. where $N_{Bundling}=1$). In particular, the transport block size is increased to 180% of the example in FIG. 6. The transport block size restriction for the assignments using bundling is reduced to 65% of the example in FIG. 6, but still allows up to 1.3 megabits per second at 5 MHz.

In FIG. 9, entries of the MCS index 16 to 22 show configuration for TTI bundling of two TTIs and entries 23 to 29 show configurations for TTI bundling over four TTIs. All bundling-supporting entries 16-29 indicate the QPSK modulation. A re-transmission may be indicated by the respective entries 30 and 31 for no bundling and bundling over 2 TTIs, respectively. It is assumed that retransmissions for bundling over 4 TTIs are not efficient and thus, not necessary. For a reasonable operation of the communication system, the target error rate of a first transmission of a packet should be assumed to be no higher than 50%; in practice, simulations have shown that an average block error rate of between 5 and 35% is in many cases optimum to achieve a high cell throughput. So if the scheduler assigns a first transmission, it should already evaluate whether bundling is required to reach the target block error rate. If an error still occurs for the first transmission, then usually the amount of additional redundancy that should be transmitted does not need to exceed or be equal to the amount of redundancy that has been transmitted in the first transmission. As the amount of redundancy usually increases with the TTI bundling size, with a maximum bundling size of 4 TTIs a maximum of 2 bundled TTIs for a retransmission is sufficient. However, this configuration as well as similar configuration for UL in FIG. 7 is not meant to limit the retransmissions in the present invention to bundling over two TTIs. In general, a corresponding entry may be defined also for the retransmission over four TTIs or the retransmissions may be signaled over the PHICH, which can trigger bundled retransmissions in different and independent ways compared to the possibilities offered by the MCS table, as outlined previously. In general, the retransmissions may be signaled in a different element and/or channel than the element and/or channel for signaling the bundling indication.

FIG. 8 illustrates another example of dynamically signaling the bundling indicator including the number of bundled TTIs and signaling the inter-TTI delay. In particular, in FIG. 8, the entries 0 to 14 of the table indicate that no TTI bundling is to be applied. Out of these entries, entries 0 to 10 support QPSK and entries 11 to 14 support 16-QAM (cf. column "modulation order"). The entries 15 to 28 indicate that bundling over two TTIs is to be applied. (cf. column "bundling TTIs"). In addition, a new column is added, titled "Inter-TTI interval" and indicating for the configurations with bundling whether the delay between the TTIs is used or not. In particular, entries 16 to 21 do not apply the delay, i.e. the delay between two subframes to which a TTI is mapped is 1 ms which means that the subframes are adjacent. The entries 22 to 28 apply the delay of 8 ms between the subframes. Evidently, if no bundling (i.e. a bundling size of 1 TTI) is indicated, then there is no inter-TTI interval and therefore the corresponding entries can be reserved or n/a ("not applicable"). It is noted that in this example, no hopping flag is signaled. However, this is not to limit this example to configurations without hopping. Hopping may still be switched on/off dynamically with and/or without bundling. The entries 29 to 31 enable signaling of the retransmission version for the configuration without bundling. Here it is assumed that no retransmissions are necessary for the configurations with bundling. However, as in the other examples, the retransmission version may also be signaled for the bundling case.

In the above examples, mapping of bundling indication to modulation and coding scheme indication has been shown. In particular, some entries of the modulation and coding scheme index has been reserved to indicate that TTI bundling is to be applied and/or the number of bundled TTIs and/or the delay between the subframes to which the bundled TTIs are mapped. The modulation and coding indication index is then transmitted as a part of the scheduling information in order to determine how the data are mapped to the resources scheduled for transmission or reception.

In summary, the generic benefits of the dynamic TTI bundling includes a lower control overhead than explicit re-transmission requests. Moreover, a lower coding rate may be dynamically supported and the time diversity gain is increased in comparison to the Releases 8 to 10 uplink TTI bundling. There is no RRC configuration activation uncertainty for enabling or disabling TTI bundling. These advantages lead to more flexibility and to a simplified resource management at the base station side of the bundling. The TTI bundling timing may be aligned with the hybrid ARQ timing in the same cell. In the downlink, the buffering requirements for local devices may be reduced by using the bundling.

All the above approaches assume that the transport block size is determined by the resource block assignment (RBA) and by MCS. The resource block assignment corresponds to number of physical resource blocks allocated for the transmission. Since the physical resource blocks (PRB) each include a predefined number of subcarriers, the resource block assignment specified the number of subcarriers allocated to the transmission or reception by the terminal. This corresponds to the transmission or reception bandwidth. An example of the determination of the transport block size in accordance with the current LTE configuration is shown in Section 7 for downlink and Section 8 for uplink of 3GPP TS 36.213,v.10.4.0, 2012, freely available at www.3gpp.org. In particular, Tables 7.1.7.1-1/8.6.1-1 and 7.1.7.2.1-1 to 7.1.7.2.5-1 are used to determine TBS index from MCS index and to determine the TBS size from TBS index and N_PRB. N_PRB is the number of assigned PRBs as read from a DCI format of the resource block assignment. For Release 8-10 UL TTI bundling, the N_PRB is determined as the number of assigned PRBs per subframe.

For the application of the dynamic bundling according to the present invention, the transport block size with bundling may be determined in the same away as the transport block size of the current LTE (assuming transmission in one TTI) and/or in the same way as for the Release 8-10 UL TTI bundling, namely by determining the N_PRB as the number of assigned PRBs per subframe. Thus, the modulation and coding scheme index (in particular, the TBS index value corresponding to the MCS index) together with the number of PRBs allocated specify the transport block size of the transport block to be mapped to the single or bundled TTIs. In other words and with reference to e.g. Table 7.1.7.2-1, the TBS is given by the ($I_{TBS}$, $N_{PRB}$) entry.

However, the present invention is not limited to such an embodiment. Alternatively, for the configurations with bundling, the MCS and the number of effectively used physical resource blocks, N_PRB_eff, may be used to look up the transport block size in a table as shown in section 7 of the 3GPP GS 36.213 (in this table, the TBS index corresponding to the signaled MCS index looks up a row of the table and the number of allocated PRBs looks up the column of the table; the resulting transport block size is found in the looked-up row and column ($I_{TBS}$, $N_{PRB\_eff}$) entry).

For instance, the PDDCH may indicate whether the coding rate or transport block size should benefit from bundling. In order to achieve this, a one bit flag may be sufficient. This one bit flag may be taken from TPC, MCS or RV. However, the flag may also be signaled within another elements or a new element may be defined to signal it.

TTI bundling provides more resources for a single transmission. This may be utilized in order to decrease the code rate and thus, make the transmission more reliable and/or to transmit more data, i.e. to increase the transport block size. In the above example, the code rate flag may indicate whether the code rate is decreased or whether the transport block size is to be increased instead, i.e. whether the TBS is determined by the ($I_{TBS}$, $N_{PRB}$) or ($I_{TBS}$, $2 \cdot N_{PRB}$) entry. A one bit flag may be sufficient for the 2-TTI bundling case. However, bundling over four TTIs may provide more possibilities of choice. For instance, the code rate may be decreased and at the same time the transport block size may be increased. Thus a flag of more than one bit may be beneficial for the signaling.

For instance, PDCCH may indicate whether coding rate or TBS should benefit from bundling by using a new indicator BUNDLING_MODE. As described above, a 1-bit flag maybe sufficient for signaling the BUNDLING_MODE. The one bit may be stolen from already present indicators such as TPC, MCS, RV, or a new bit may be added.

The BUNDLING_MODE indicator with value 0, BUNDLING_MODE=0, may indicate that the transport block size is determined as in Release 8-10, i.e. N_PRB is the number of PRBs assigned per subframe and therefore the TBS is determined by the ($I_{TBS}$, $N_{PRB}$) entry. The value 1, BUNDLING_MODE=1, may indicate that the transport block size is determined as the sum of PRBs assigned in all bundled subframes, i.e. compared to the above configuration for BUNDLING_MODE=0, the effective number of PRBs is multiplied by the number of subframes and therefore the TBS is determined by the ($I_{TBS}$, $N_{Bundling} \cdot N_{PRB}$) entry, where $N_{Bundling}$ is the number of bundled TTIs or the subframe bundling size in TTIs in the present invention.

For instance, let us assume that the DCI format 1A (DL) indicates that PRB#0-9 (10 PRBs) are used with MCS #15 (MCS index 15, i.e. the 16$^{th}$ entry of the MCS table) in a 4-TTI bundle. When BUNDLING_MODE=0, this configuration of MCS index I_MCS=15 results in the transport block size index I_TBS=14. The number of assigned PRBs is N_PRB=10. When looking to the Table 7.1.7.2.1-1 in TS 36.213 at the row index 14 and the column index 10, the transport block size TBS=2856 bits is found. When BUNDLING_MODE=1, the modulation and coding scheme index remains the same I_MCS=15 and thus, the transport block size index is also the same as in previous example, namely, I_TBS=14. However, the number of the PRBs effectively used changes to N_PRB_eff=4*10=40. When looking to the same Table 7.1.7.2.1-1 in TS 36.213, at the row index 14 and the column index 40, the transport block size TBS=11448 bits can be found.

This implies that the maximum of N_PRB after multiplication by the TTI bundle size is not exceeding 110 as defined in Table 7.2.7.2.1-1. In order to consider this maximum, the limitation to 110 may be performed with an optional adjustment of the TBS value. For example, the rule of determining the TBS from the ($I_{TBS}$, $N_{Bundling} \cdot N_{PRB}$) entry can be applicable only in case of assigning between 1 and $$\left\lfloor \frac{110}{N_{Bundling}} \right\rfloor$$

PRBs; for higher values, a correspondence table between the TBS size as obtained from the ($I_{TBS}$, $N_{PRB}$) entry and the effective transport block size TBS_eff (which is the finally applicable transport block size) can be employed, where the ratio of TBS_eff to TBS is substantially in the order of $N_{Bundling}$, preferably within an interval of [$0.95 \cdot N_{Bundling}$; $1.05 \cdot N_{Bundling}$].

In the above example, one value of the bundling mode indicator signals that the transport block size is determined based on a transport block size index indicated in the scheduling information and based on a product of the assigned number of subcarriers (physical resource blocks) and the number of bundled TTIs.

In the following, another alternative example is provided for values of the BUNDLING_MODE indicator. The case in which BUNDLING_MODE=0 remains the same as same as described in the previous example, i.e., the TBS is determined as in Release 8-10, i.e. N_PRB is the number of PRBs assigned per subframe. However, the case in which BUNDLING_MODE=1 differs from the above example. In particular, the transport block size index I_TBS is modified by the number of subframes in the TTI bundle. Let us assume that the DCI format 1A (DL) indicates PRB#0-9, meaning that 10 PRBs are assigned for the transmission, and that MCS index with value 3 in a 4-TTI bundle is configured. For the BUNDLING_MODE=0 the MCS index I_MCS=3 leads to the TBS index I_TBS=3. The number of assigned PRBs is N_PRB=10. This configuration leads according to the Table 7.2.7.2.1-1 to the transport block size of TBS=568 bits using the (3,10) entry. On the other hand, when BUNDLING_MODE=1, the MCS index remains the same, namely I_MCS=3, which, however, results in a different transport block size index, namely in I_TBS=4*3=12. With the N_PRB=10 and using the Table 7.2.7.2.1-1, the transport block size of TBS=2280 bits is found using the (12,10) entry. In that way, in Table 7.2.7.2.1-1 the general approach is to lookup entry ($N_{Bundling} \cdot I_{TBS}$, $N_{PRB}$).

This implies that the maximum of I_TBS after multiplication by TTI bundle size is 26 as in Table 7.2.7.2.1-1. The exceeding of this value may be avoided by limiting it to 26 with an optional adjustment of the TBS value. For example, the rule of determining the TBS from the ($N_{Bundling} \cdot I_{TBS}$, $N_{PRB}$) entry can be applicable only in case of assigning TBS between 0 and $$\left\lfloor \frac{26}{N_{Bundling}} \right\rfloor;$$

for larger values, a correspondence table between the TBS size as obtained from the ($I_{TBS}$, $N_{PRB}$) entry and the effective transport block size TBS_eff (which is the finally applicable transport block size) can be employed, where the ratio of TBS_eff to TBS is substantially in the order of $N_{Bundling}$, preferably within an interval of [$0.95 \cdot N_{Bundling}$; $1.05 \cdot N_{Bundling}$].

In the above example, one value of the bundling mode indicator signals that the transport block size is determined based on a transport block size index indicated in the scheduling information, multiplied by the number of bundled TTIs, and based on the assigned number of subcarriers (physical resource blocks).

According to another example relating to signaling of the bundling mode indicator, the case in which BUNDLING_MODE=0 is the same as in the above examples, i.e., the TBS is determined as in Release 8-10 such that the N_PRB is the number of PRBs assigned per subframe. However, in the case in which BUNDLING_MODE=1, the TBS is determined differently. In particular, the effective transport block size TBS_eff is determined as a multiplication of the TTI bundle size with the value obtained as in Release 8, i.e. with the transport block size for a single subframe.

For instance, assume that the DCI format 1A (DL) indicates that PRB#0-9 (10 PRBs) are used with MCS #3 (I_MCS=3) in a 4-TTI bundle. When BUNDLING_MODE=0, the I_MCS=15, which results in I_TBS=14. This, together with N_PRB=10 and Table 7.2.7.2.1-1 results in TBS=2856 bits using the (14,10) entry as in the first example above. When BUNDLING_MODE=1, the same I_MCS=15, resulting in I_TBS=14, and N_PRB=10 are used to lookup the same value of the tabelled TBS of 2856. The TBS_eff is then determined by multiplying the tabelled TBS by the number of bundled TTIs: TBS_eff=$N_{Bundling}$·TBS, i.e. in the example TBS_eff=4*2856 bits=11424 bits. It is assumed that the "tabelled TBS" is the TBS applicable for a single subframe, i.e. the entry that is looked up for ($I_{TBS}$, $N_{PRB}$).

It is noted that the terms "transport block size" is used in LTE for determining the size of the data which is mapped into one TTI. In this description, the transport block size also refers to number of data mapped into one TTI (if no bundling is applied) or into a plurality of bundled TTIs if bundling is applied. The transport block data are encoded with an error correction code before the mapping to the TTI and inserted a CRC as described in the background section.

Alternatively, in order to always allow a certain code rate improvement, for transport block size look up table the number of effectively used PRBs, N_PRB_eff, may be determined for bundling sizes larger than 1 as:

N_PRB_eff=(TTI_bundle_size/2)×N_PRB, wherein the TTI_bundle_size is the number of TTIs bundled and N_PRB is referring to the number of PRBs allocated for the transmission according to the scheduling information, and the TBS is looked up from the ($I_{TBS}$, $N_{PRB\_eff}$) entry. In this alternative, no explicit signaling of an additional flag is necessary. In case that bundling sizes other than 1 are used that are not divisible by 2, preferably N_PRB_eff is determined as $$N_{PRB\_eff} = \left\lfloor \frac{N_{Bundling}}{2} \right\rfloor \cdot N_{PRB}$$

or $$N_{PRB\_eff} = \left\lceil \frac{N_{Bundling}}{2} \right\rceil \cdot N_{PRB}.$$

The denominator in these formulas can be replaced by other values, preferably by the smallest number of allowed TTI bundling sizes $N_{Bundling}$ greater than 1.

Accordingly, for the TTI bundling over two TTIs, only the code rate is improved since the number of effectively used PRBs, N_PRB_eff, has the same value as the number of assigned PRBs (PRBs per single subframe). This results in the half code rate in comparison with the configuration without bundling. However, for the TTI bundling over 4 TTIs, the effectively used transport block size increases by two while the code rate decreases to a half, same as for bundling over 2 TTIs.

TBS increase may also be realised as shown in the above examples, for instance, by multiplying the TBS size with a multiplier smaller than the number of bundled TTIs or by multiplying the TBS index by the number smaller than of bundled TTIs. Consequently, instead of using $N_{Bundling}$ as a multiplier a multiplier of e.g.

$$\left\lfloor \frac{N_{Bundling}}{2} \right\rfloor \text{ or } \left\lceil \frac{N_{Bundling}}{2} \right\rceil$$

is used, where the denominator can be replaced by other values, preferably by the smallest number of allowed TTI bundling sizes $N_{Bundling}$ greater than 1.

Still alternatively, a semi-static configuration may be applied for deciding whether the coding rate and/or transport block size should benefit from bundling. This semi-static configuration may be performed similarly as described above with reference to signaling over PDCCH mutatis mutandis, i.e. by providing a bundling mode indicator and employing it as described in any of the above examples.

It is noted that the above described alternatives and examples may also be used in a case in which the subframe (TTI) bundling is not indicated dynamically (by the DCI, i.e. by the scheduling information), i.e. if the subframe (TTI) bundling itself is activated semi-statically by e.g. the RRC as in the uplink VoIP in Releases 8-10. This means that according to another aspect of the present invention the size of the data to be mapped a TTI bundle may be determined by:
  determining the TBS based on a number of subcarriers (or PRBs) assigned for transmission/reception in a single subframe multiplied by the number of bundled TTIs (size of the TTI bundle) or
  determining the TBS based on multiplying the TBS for a single subframe multiplied by the number of bundled TTIs (size of the TTI bundle) or
  determining the TBS based on an index indicating the TBS for the single subframe, the index multiplied by the number of bundled TTIs (size of the TTI bundle) or
  as in any of the previous cases in which the multiplying with the TTI bundle size is replaced by multiplying with a number smaller than the TTI bundle size and larger or equal to 1. Multiplying by 1 has the same effect as taking the TBS of the single subframe, which may also be one of the alternatives. Accordingly, advantageously, only a number smaller than the TTI bundle size and larger than 1 may be applied.

It may be noted that at least in the LTE context, other methods such as spatial multiplexing using multiple transit layers can be employed to modify the TBS compared to single layer TBS determination rules. Such modification rules can be extended and combined with the extensions due to TTI bundling in the present invention.

The above configurations or their subsets may be signaled within the bundling mode indicator dynamically or semi-statically. However, it may also be predefined.

Summarizing, the bundled TTI may be used for mapping therein more data than into a single TTI or for increasing error protection, i.e. decreasing the code rate. The type of mapping may be signaled in a mapping flag (bundling mode indicator) for indicating whether the code rate is to be reduced or whether the data size mapped (e.g. the transport block size) is to be increased or both with respect to the configuration without bundling, i.e. for a single subframe.

In the above examples, the application of bundling has been indicated within the scheduling information, in particular, within the MCS index instead of the higher-order modulation schemes. Regarding at least downlink bundling, the redundancy version (RV) field may be used to accommodate not only the redundancy version but also the TTI-bundling size, since at least up to Release 10 of the LTE specifications and explicit redundancy version field is present in all downlink transmission related DCI formats carrying downlink scheduling information.

This is illustrated in FIG. 10. The redundancy version 0 (RV0) index is kept without bundling because it is mainly useful for the first transmission (new data transmission) of a packet if no bundling is required. The redundancy version 2 (RV2) index is also kept without bundling, since it is mainly useful for re-transmissions without bundling in case the first transmission has not used bundling. The least attractive redundancy versions for retransmissions (RV3, RV1) indices are used to trigger the TTI bundling in the transmissions. In particular, the RV1 indicates redundancy version of zero for bundling over 4 TTIs. The RV3 indicates redundancy version 2 for the bundling over 2 TTIs. In particular, in the case of 4 ms bundling (or bundling over four TTIs), the assumed redundancy version is almost unimportant as it is likely that the whole codeword (e.g. realised as a circular) buffer is transmitted at least once within the bundle. Thus the resulting code rate is less than one third in the LTE context, which is the native code rate generated by the FEC encoder. In the case of 2 millisecond bundling (or bundling over two TTIs), the redundancy version 2 is assumed to be a compromise between a good first transmission assumption and a good re-transmission assumption.

It is noted that this is only an example, and the present invention is not limited thereto. Alternatively, the redundancy version 0 may be assumed for a good first transmission assumption and/or the redundancy version 3 may be assumed for a good re-transmission assumption of a previous two TTI bundle.

Another possibility is to tie a certain hybrid ARQ process or processes to a certain amount of TTI bundling. The process or processes tied for TTI bundling may be configured by RRC configuration, i.e. semi-statically. When a DCI format indicates such a hybrid ARQ process, then it implies that e.g. two or four bundled TTI transmissions are to be employed for the assigned transmission.

In the LTE system in the downlink, there shall be a maximum of 8 downlink HARQ processes per serving cell for FDD. For TDD, the maximum number of downlink HARQ processes per serving cell shall be determined by the UL/DL configuration as indicated in Table 7-1 of TS 36.213. Accordingly, the maximum number of HARQ processes for TDD may take one of the following values: 4, 6, 7, 9, 10, 12, 15.

In the uplink transmission mode 1 for the FDD, the maximum of 8 uplink HARQ processes is used per serving cell for non-subframe bundling operation and the maximum of 4 uplink HARQ processes are used for subframe bundling operation. On the other hand, in the uplink transmission mode 2 in FDD, the maximum of 16 uplink HARQ processes is used per serving cell for non-subframe bundling operation.

In accordance with an embodiment of the present invention, certain HARQ process(es) are reserved for (or tied to) TTI bundling with a certain number of bundled subframes. These reserved HARQ processes may be signaled, for instance, semi-statically, e.g. configured by RRC. For example, an RRC information element is provided that configures for a given HARQ process ID number the number of associated bundled subframes.

At least for downlink soft buffer management, it might be beneficial to simultaneously disable other HARQ processes so that "their" buffer can be used for the bundling. For example, if DL HARQ process number 5 is associated with 4-TTI bundling, then DL HARQ processes number 6, 7, and 8 are disabled due re-use of their buffers (e.g. for process 5; details maybe be left to the implementation). It can be preferable for this aspect that for each process that is tied to a bundling of size N, N−1 other HARQ processes are disabled.

In downlink, each applicable DCI format includes an explicit HARQ process ID field for Indicating such a HARQ process which implies according to the RRC-configuration the corresponding bundled TTI transmission.

In uplink, the HARQ process ID is usually tied to the subframe number in which the transmission occurs. Therefore, some mapping between a TTI bundling HARQ ID and a subframe number is required. For example, HARQ process ID #x is the HARQ process that would be associated to a subframe number satisfying $(10 \times n_f + \lfloor n_s/2 \rfloor - \text{HARQ\_ID})$ mod 8=0. Here, nf denotes the radio frame number, ns denotes the slot number within a radio frame, and HARQ_ID the number of the HARQ process used for a particular TTI-bundle size.

In an alternative embodiment, a combination of an indication of an RV0 transmission together with a transmit power command field is used to indicate that TTI bundling is used. RV0 is mostly indicated for new data transmissions. Such first transmissions are usually most attractive for TTI bundling, as these are associated with the smallest possible transmission delay. Consequently, if RV0 is indicated, then in the uplink transmission case the following exemplary Table 1 can be used to indicate the transmit power command as well as whether (and with what value) TTI bundling should be employed (of course, the arrangement could be different and/or higher or additional bundling sizes could be indicated).

TABLE 1

| Value of 'TPC command for scheduled PUSCH' | Subframe Bundling Size [TTI] | TPC field according to Table 5.1.1.1-3 in 36.213 v10.4.0 |
| --- | --- | --- |
| 0 | 1 | 0 |
| 1 | 1 | 1 |
| 2 | 2 | 0 |
| 3 | 2 | 1 |

For the downlink case, the corresponding table (again preferably only applicable if RV0 is indicated) is given by Table 2.

TABLE 2

| Value of 'TPC command for PUCCH' | Subframe Bundling Size [TTI] | TPC field according to Table 5.1.1.1-3 in 36.213 v10.4.0 |
| --- | --- | --- |
| 0 | 1 | 0 |
| 1 | 1 | 1 |
| 2 | 2 | 0 |
| 3 | 2 | 1 |

Instead of tying the possibility to use TTI bundling to a "bundling enable" configuration, it could be reasonable to alternatively employ the methods outlined in the present invention only if a first transmission or a new transport block transmission is indicated. This is for example facilitated by a new data indicator (NDI) in the corresponding DCI format. Either a fixed NDI value (e.g. 1) indicated that a new data transmission is assigned, or a toggled NDI value compared to the previous NDI value indicated a new data transmission. In either case, if a new data transmission is indicated, it is a first transmission of a packet. A first transmission of a packet is usually most attractive for TTI bundling, as it is associated with the smallest possible transmission delay. So for example, the approaches shown if FIG. 5A or 5B or 6-10 are only employed for a first transmission of a packet, but not otherwise.

In another embodiment, the RV indication is used to determine the inter-TTI interval in case of a bundling size>1. In this case, a first RV value indicates a first inter-TTI interval, and a second RV value indicates a second inter-TTI value. For transmission, in these cases RV0 is preferably assumed, as it is most attractive for a first transmission and also TTI bundling is most attractive for a first transmission of a transport block.

In another embodiment particularly attractive for the low-cost MTC scenario, a CSI request field is interpreted as a bundling indicator. For the low-cost MTC scenario, transmissions occur only sporadically and typically with a small data rate. Requesting a CSI from such a terminal would therefore cost time as well as uplink overhead. Instead, it may be more efficient and reasonable to assign transmission resources without explicit CSI knowledge. In such a case, the CSI field in a DCI format is no longer required for this purpose, and can therefore be used as a bundling indicator, where a first value of the CSI request field indicates no TTI bundling and a second value of the CSI request field indicates that TTI bundling is used for the assigned transmission.

Depending on the TTI-bundling configuration, various manners of signaling the positive (ACK) and/or negative acknowledgement (NAK) for the bundled TTIs may be advantageous. For instance, a single positive and/or negative acknowledgement may be transmitted after the reception of the entire TTI-bundle. This means that no individual reception feedback is provided for the TTIs in the bundle. This approach requires less signaling overhead and saves the corresponding transmission power. Alternatively, an individual positive and/or negative acknowledgement may be provided for each of the bundled TTIs. This approach requires more overhead and consumes the respective transmission power. However, it is possible to stop the transmission of the data from bundled TTIs if the decoding can be successfully performed already based on the first received TTIs. This benefit becomes particularly relevant for the embodiments in which the TTIs in a single bundle are mapped on subframes which are not adjacent, i.e. when there is a delay between the subframes to which a bundle of TTIs is mapped in the order of or more than the time required to decode a respective subframe and deliver the corresponding feedback to the transmitter.

For instance, when the delay between the TTIs in a bundle is 8 ms, such as in the case in which the delay is aligned to the HARQ round trip time (RTT) in LTE FDD, the transmitter transmits a first subframe. Then, the receiver may check whether the successful decoding is possible based on the received first subframe from the bundle. If the decoding is successful, meaning that no errors occurred or the errors could be corrected, the receiver may transmit to the transmitter a positive acknowledgement or another indicator for indicating that the remaining subframes from the bundle do not need to be transmitted. If, on the other hand, the decoding is not possible, no feedback needs to be provided, or, alternatively, an individual feedback on a per subframe basis may be provided. Such "intermittent" feedback preferably uses the ACK/NAK resource determination procedures and timing as for the non-bundling case using the received information as the basis/reference, for example as outlined in 3GPP TS 36.213 v10.4.0, section 7.3 and 10 or 9.1.2, as applicable. This "intermittent" decoding and feedback process can be repeated mutatis mutandis for later transmissions of the same TTI bundle. The lack of feedback or an explicit negative acknowledgement should prompt the transmitter to continue with the bundled transmission as advertised.

If no decoding should be attempted after each TTI of a bundle, then decoding is preferably only attempted after reception of the last subframe of a TTI bundle, and preferably the procedures and timing for determining and transmitting the ACK/NACK feedback as for the non-bundling case are adopted, where the last subframe of a TTI bundle preferably serves as a reference.

The case of intermittent decoding and feedback may be particularly applicable to the usage of TDD, particularly if an additional inter-TTI interval>1 is employed. In such cases, it can frequently occur that at least between two transmissions of a TTI bundle, sufficient time is available for a decoding attempt and a corresponding ACK/NAK feedback transmission. It is therefore envisaged that intermittent decoding can be performed after reception of at least one non-final subframe of a TTI bundle, but not necessarily after every reception of a subframe of a TTI bundle. In a preferable embodiment, such intermittent decoding or ACK/NAK feedback is only employed after a subframe if the next subframe of the same bundle occurs at least 4 or alternatively 8 subframes later.

An alternative to determine ACK/NAK resources compared to the provisions of current LTE specifications for the TTI bundling case is that the resources are indicated explicitly, preferably at the same time when bundling is enabled. In this case, the terminal as well as the base station has a-priori knowledge which feedback channel resources are used. This can make the feedback resource management easier particularly at the base station side, because it is then easier to avoid collisions of ACK/NAK resources from/for two different terminals.

In accordance with another embodiment of the present invention, a scheduling node 1190 is provided for transmitting and/or receiving data in a multicarrier communication system in which the transmission of data is performed in transmission time intervals. The scheduling node 1190 includes a control information transmission unit 1195 for transmitting scheduling information indicating resources on which the terminal is scheduled to transmit (such as terminal 1120) and/or receive (such as terminal 1110) data, and including a bundling indication for indicating whether transmission time interval bundling is to be applied or not for the scheduled transmission and/or reception. Moreover, the scheduling node may comprise a data reception unit 1197 for receiving the data from the terminal 1120 in the scheduled transmission resources and in accordance with the transmitted bundling indication. Alternatively or in addition, the scheduling node may comprise a data transmission unit 1192 for transmitting the data to the terminal 1110 in the scheduled reception resources and in accordance with the transmitted bundling indication.

The present invention further provides methods for transmission and reception of data. Some examples of the methods are illustrated in FIGS. 12A and 12B.

In particular, a method is provided for transmitting and/or receiving data in a multicarrier communications system, transmission and/or reception of data being performed in transmission time intervals. The method is to be performed at a scheduling node and comprises transmitting 1220 scheduling information, which indicates resources on which a terminal is scheduled to transmit or receive data and including a bundling indication for indicating whether the scheduled transmission is to be performed in one or more transmission time intervals (whether or not TTI bundling is to be applied). The method further includes transmitting 1280 and/or receiving 1260 of the data in the scheduled resources (over a channel 1201) from the terminal in accordance 1210, 1215 with the transmitted bundling indication. It is noted that as shown in FIGS. 12A and 12B, a step of configuring 1210, 1215 the terminal transmission or reception of data (corresponding to configuring the scheduling node own reception and transmission of data respectively). This step may be a part of scheduling performed by the scheduling node and may include selection of the resources and judging whether bundling is to be applied for the current transmission or reception to be performed by the terminal. The step of judging may be configured to be performed only in the case the bundling is generally enabled. The configuring step provides a result (configuration) to the terminal via transmission. On the other hand, the scheduling node also handles 1260, 1280 according to this configuration, i.e. transmits or receives data in the configured resources with or without bundling.

Moreover, a method is provided for transmitting data in a multicarrier communications system, transmission of data being performed in transmission time intervals. The method is to be performed at a terminal (mobile node) and comprises receiving 1230 of scheduling information from a scheduling node, which indicates resources on which the terminal is scheduled to transmit data and including a bundling indication for indicating whether the scheduled transmission is to be performed in one or more transmission time intervals (whether or not TTI bundling is to be applied). The method further includes transmitting 1250 of the data in the scheduled resources in accordance 1240 with the received bundling indication. As exemplified in FIG. 12A, the method may further include a step of configuring 1240 the transmission resources in accordance with the received scheduling information including the bundling indication.

Moreover, a method is provided for receiving data in a multicarrier communications system, reception of data being performed in transmission time intervals. The method comprises: receiving 1230 scheduling information indicating resources on which the terminal is scheduled to receive of data and including a bundling indication for indicating whether the scheduled reception is to be performed in one or more transmission time intervals; and receiving 1290 the data in the scheduled resources in accordance 1270 with the received bundling indication. As exemplified in FIG. 12A, the method may further include a step of configuring 1270 the transmission resources in accordance with the received scheduling information including the bundling indication.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present invention relates to transmitting and receiving data in a multicarrier communication system in which the transmission and reception is performed on a transmission time interval basis. In particular, dynamic bundling of transmission time intervals is dynamically configurable for each scheduling assignment. The dynamic bundling may be applied in uplink and/or in downlink transmission between a terminal and a network node.

The invention claimed is:

1. An apparatus for transmitting data in a multicarrier communications system, transmission of data being performed in transmission time intervals, the apparatus comprising:
a control information receiver which, in operation, receives scheduling information indicating resources on which the apparatus is scheduled to transmit data and including a bundling indication for indicating whether the scheduled transmission is to be performed in one or more transmission time intervals and an inter transmission time interval indicating a delay between transmission time intervals belonging to a same TTI bundle; and
a transmitter which, in operation, transmits the data in the scheduled resources in accordance with the received bundling indication.

2. An apparatus for receiving data in a multicarrier communications system, reception of data being performed in transmission time intervals, the apparatus comprising:
a control information receiver which, in operation, receives scheduling information indicating resources on which the apparatus is scheduled to receive of data and including a bundling indication for indicating whether the scheduled reception is to be performed in one or more transmission time intervals and a modulation indicator consisting of a plurality of bits; and a data receiver which, in operation, receives the data in the scheduled resources in accordance with the received bundling indication; and wherein the modulation indicator takes a plurality of values, each indicating a modulation scheme and/or size of coded data to be employed for the scheduled transmission or reception in a single transmission time interval, and at least one value indicates that the scheduled transmission or reception is to be performed in a plurality of transmission time intervals.

3. The apparatus according to claim 1, wherein a delay between the one or more bundled transmission time intervals corresponds in its length to a time interval between two transmissions or receptions of data of a same ARQ process.

4. The apparatus according to claim 1, wherein the scheduling information includes a modulation indicator consisting of a plurality of bits and is defined to be capable of taking:

a plurality of values, each indicating a modulation scheme and/or size of coded data to be employed for the scheduled transmission or reception in a single transmission time interval; and at least one value indicating that the scheduled transmission or reception is to be performed in a plurality of transmission time intervals.

5. The apparatus according to claim 1, wherein the bundling indication includes a number of transmission time intervals in which the scheduled transmission or reception is to be performed.

6. The apparatus according to claim 1, wherein the apparatus determines the size of the data for the scheduled transmission or reception based on a number of transmission time intervals in which the data is to be transmitted or received and based on a number of frequency resources effectively used for the scheduled transmission or reception.

7. The apparatus according to claim 1, wherein the scheduling information further includes a redundancy version indicator for indicating a value that is used for rate matching an output of a forward error correction encoder such as a turbo or convolutional encoder, or a process number indication which indicates a number of an addressed ARQ process and at a same time the bundling indication.

8. A method for transmitting data in a multicarrier communications system, transmission of data being performed in transmission time intervals, the method comprising:

receiving scheduling information indicating resources on which a terminal is scheduled to transmit data and including a bundling indication for indicating whether the scheduled transmission is to be performed in one or more transmission time intervals and a modulation indicator consisting of a plurality of bits, wherein the modulation indicator takes a plurality of values, each indicating a modulation scheme and/or size of coded data to be employed for the scheduled transmission or reception in a single transmission time interval, and at least one value indicates that the scheduled transmission or reception is to be performed in a plurality of transmission time intervals; and transmitting the data in the scheduled resources in accordance with the received bundling indication.

9. A method for receiving data in a multicarrier communications system, reception of data being performed in transmission time intervals, the method comprising:

receiving scheduling information indicating resources on which a terminal is scheduled to receive of data and including a bundling indication for indicating whether the scheduled reception is to be performed in one or more transmission time intervals and an inter transmission time interval indicating a delay between transmission time intervals belonging to a same TTI bundle; and receiving the data in the scheduled resources in accordance with the received bundling indication.

10. The method according to claim 8, wherein the scheduling information further includes an inter transmission time interval indicating a delay between transmission time intervals belonging to a same TTI bundle.

11. The method according to claim 8, wherein a delay between the one or more bundled transmission time intervals corresponds in its length to a time interval between two transmissions or receptions of data of a same ARQ process.

12. The method according to claim 8, wherein the bundling indication includes a number of transmission time intervals in which the scheduled transmission or reception is to be performed.

13. The method according to claim 8, further comprising a step of determining the size of the data for the scheduled transmission or reception based on a number of transmission time intervals in which the data is to be transmitted or received and based on a number of frequency resources effectively used for the scheduled transmission or reception.

14. The apparatus according to claim 2, wherein the scheduling information further includes an inter transmission time interval indicating a delay between transmission time intervals belonging to a same TTI bundle.

15. The apparatus according to claim 2, wherein a delay between the one or more bundled transmission time intervals corresponds in its length to a time interval between two transmissions or receptions of data of a same ARQ process.

16. The apparatus according to claim 2, wherein the scheduling information further includes a redundancy version indicator for indicating a value that is used for rate matching an output of a forward error correction encoder such as a turbo or convolutional encoder, or a process number indication which indicates a number of an addressed ARQ process and at a same time the bundling indication.

17. The method according to claim 9, wherein the scheduling information further includes an inter transmission time interval indicating a delay between transmission time intervals belonging to a same TTI bundle.

18. The method according to claim 9, wherein a delay between the one or more bundled transmission time intervals corresponds in its length to a time interval between two transmissions or receptions of data of a same ARQ process.

19. The method according to claim 9, wherein the scheduling information includes a modulation indicator consisting of a plurality of bits and is defined to be capable of taking:

a plurality of values, each indicating a modulation scheme and/or size of coded data to be employed for the scheduled transmission or reception in a single transmission time interval; and at least one value indicating that the scheduled transmission or reception is to be performed in a plurality of transmission time intervals.

* * * * *